(12) United States Patent
Baumgartner et al.

(10) Patent No.: US 11,090,559 B2
(45) Date of Patent: Aug. 17, 2021

(54) GAMING PEDAL ASSEMBLY

(71) Applicant: Logitech Europe S.A., Lausanne (CH)

(72) Inventors: Simon Baumgartner, Cork (IE); Jan Stoeckli, Jongny (CH); Cian Connolly, Cork (IE); Davin O'Mahony, Cork (IE); Cheng Hao Chiu, Hsinchu (TW); Ping Hao Chang, Hsinchu (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/731,875

(22) Filed: Dec. 31, 2019

(65) Prior Publication Data
US 2021/0197083 A1 Jul. 1, 2021

(51) Int. Cl.
| | | |
|---|---|---|
| A63F 13/245 | (2014.01) | |
| A63F 13/803 | (2014.01) | |
| B60T 7/04 | (2006.01) | |
| G01L 1/22 | (2006.01) | |

(52) U.S. Cl.
CPC .......... *A63F 13/245* (2014.09); *A63F 13/803* (2014.09); *B60T 7/042* (2013.01); *G01L 1/22* (2013.01); *G01L 1/2206* (2013.01); *G01L 1/2218* (2013.01); *G01L 1/2225* (2013.01)

(58) Field of Classification Search
CPC .................. A63F 13/245; A63F 13/803; A63F 13/1062; B06T 7/042; G01L 1/22; G01L 1/2206; G01L 1/2218; G01L 1/2225
See application file for complete search history.

(56) References Cited

U.S. PATENT DOCUMENTS 4,058,178 A * 11/1977 Shinohara ............. B66C 23/905
  177/146
4,258,566 A * 3/1981 Decker .................... G01L 5/04
  73/862.381
(Continued)

FOREIGN PATENT DOCUMENTS

DE 10007841 A1 * 9/2001 ............... G01L 1/22
DE 10158600 A1 * 6/2003 ............. A61B 5/224

OTHER PUBLICATIONS

Fanatec "CLS Elite Pedals LC" Retrieved from internet on Jan. 10, 2019. Retreieved from <https://fanatec.com/us-en/pedals/csl-elite-pedals-lc>, 11 pages.

*Primary Examiner* — Steven J Hylinski
(74) *Attorney, Agent, or Firm* — Kilpatrick Townsend & Stockton

(57) ABSTRACT

In certain embodiments, a gaming pedal assembly comprises a base platform and a pedal arm rotatably coupled to the base platform at a first mounting location that provides a first axis of rotation for the pedal arm relative to the base platform. The gaming pedal assembly further includes a piston assembly having a resistance profile, the piston assembly coupled to the pedal arm at a coupling location that provides a second axis of rotation for the piston assembly relative to the pedal arm. The piston assembly is rotatably coupled to the base platform at a second mounting location that provides a third axis of rotation for the piston assembly relative to the base platform. The piston assembly compresses according to the resistance profile of the piston assembly in response to a user interface region of the pedal arm receiving a pressing force.

18 Claims, 25 Drawing Sheets

(56) References Cited

U.S. PATENT DOCUMENTS

| | | | | |
|---|---|---|---|---|
| 4,978,177 A * | 12/1990 | Ingraham | B60Q 1/44 188/158 |
| 5,078,016 A * | 1/1992 | Russo | B22D 11/053 73/862.541 |
| 5,116,051 A * | 5/1992 | Moncrief | A63F 13/06 463/36 |
| 5,505,281 A * | 4/1996 | Lee | A63B 21/0083 188/299.1 |
| 5,563,355 A * | 10/1996 | Pluta | B60T 7/042 303/188 |
| 5,791,445 A * | 8/1998 | Kaufmann | F15B 15/1428 156/86 |
| 5,890,996 A * | 4/1999 | Frame | A63B 21/154 482/111 |
| 5,992,553 A * | 11/1999 | Morrison | B62M 6/45 180/206.2 |
| 6,533,366 B1 * | 3/2003 | Barron | B60T 8/346 251/11 |
| 8,002,674 B2 * | 8/2011 | Piaget | A63B 22/0056 482/52 |
| 10,417,930 B1 * | 9/2019 | Fraser | G09B 9/042 |
| 2001/0039230 A1 * | 11/2001 | Severinsky | B60T 8/17 477/3 |
| 2003/0205932 A1 * | 11/2003 | Anderson | B60T 11/20 303/114.1 |
| 2004/0104618 A1 * | 6/2004 | Yamamoto | B60T 13/741 303/20 |
| 2004/0147317 A1 * | 7/2004 | Ito | A63F 13/218 463/36 |
| 2004/0255688 A1 * | 12/2004 | Ok | G01N 3/00 73/818 |
| 2005/0204855 A1 * | 9/2005 | Fujiwara | G05G 1/38 74/512 |
| 2006/0064977 A1 * | 3/2006 | Ohlig | B60T 7/042 60/534 |
| 2006/0230870 A1 * | 10/2006 | Fukase | B60T 7/06 74/512 |
| 2007/0001508 A1 * | 1/2007 | Schluter | B60T 17/18 303/114.3 |
| 2007/0108837 A1 * | 5/2007 | Ohkubo | B60T 8/4081 303/122.08 |
| 2007/0188018 A1 * | 8/2007 | Reuter | B60T 7/042 303/114.1 |
| 2008/0048082 A1 * | 2/2008 | Pope | B62D 25/12 248/354.5 |
| 2008/0110289 A1 * | 5/2008 | Fujiwara | B60T 7/042 74/512 |
| 2008/0246333 A1 * | 10/2008 | Joyce | B60T 13/161 303/10 |
| 2008/0257670 A1 * | 10/2008 | Drumm | B60T 8/4077 188/358 |
| 2008/0307920 A1 * | 12/2008 | Fujiwara | G01L 5/225 74/512 |
| 2009/0113890 A1 * | 5/2009 | Ebert | B60T 13/585 60/562 |
| 2010/0084915 A1 * | 4/2010 | Crombez | B60T 8/4077 303/155 |
| 2010/0161193 A1 * | 6/2010 | Piel | B60T 8/4275 701/78 |
| 2011/0290066 A1 * | 12/2011 | Fujiwara | B60T 8/3255 74/514 |
| 2012/0023927 A1 * | 2/2012 | Klimes | B60T 8/409 60/552 |
| 2012/0091788 A1 * | 4/2012 | Weiberle | B60T 11/18 303/15 |
| 2012/0137674 A1 * | 6/2012 | Sokou | B60T 7/042 60/547.1 |
| 2012/0234100 A1 * | 9/2012 | Kempainen | G01L 1/2225 73/760 |
| 2013/0167664 A1 * | 7/2013 | Fujiwara | G01L 5/225 73/862.637 |
| 2014/0150599 A1 * | 6/2014 | Fujiwara | G01L 5/225 74/512 |
| 2016/0122167 A1 * | 5/2016 | White | B66F 9/183 414/621 |
| 2017/0225664 A1 * | 8/2017 | Beever | B60T 7/042 |
| 2018/0001875 A1 * | 1/2018 | Houtman | B60T 11/18 |

* cited by examiner

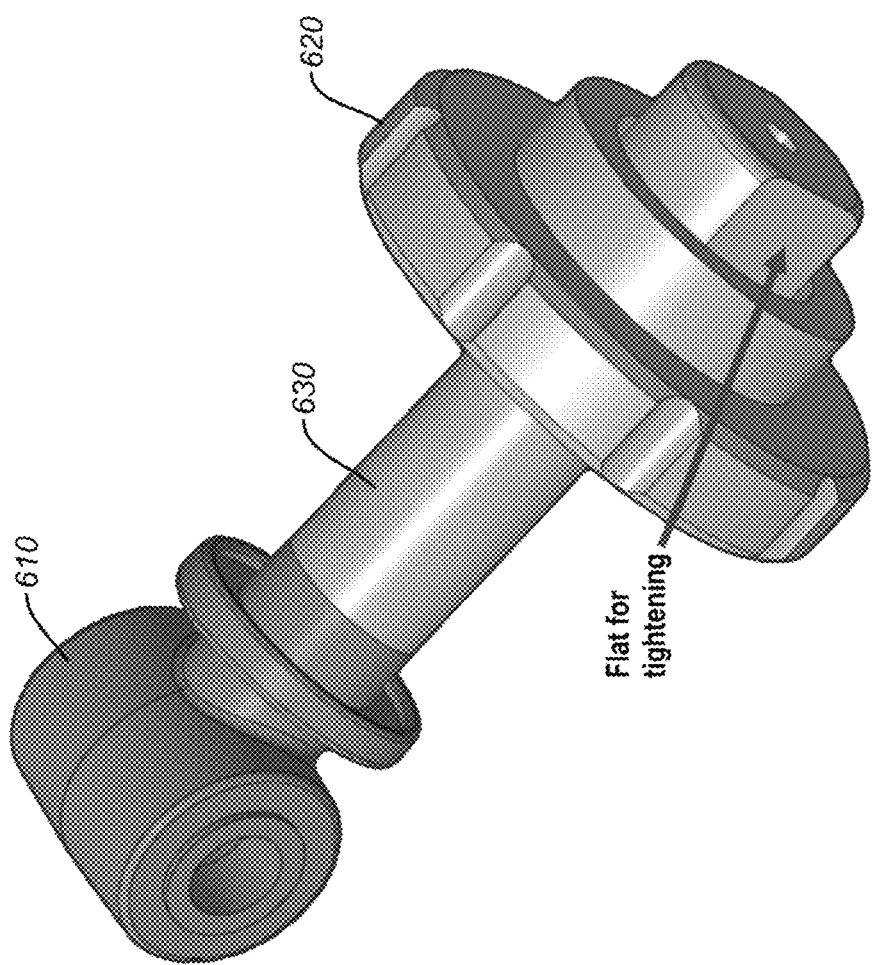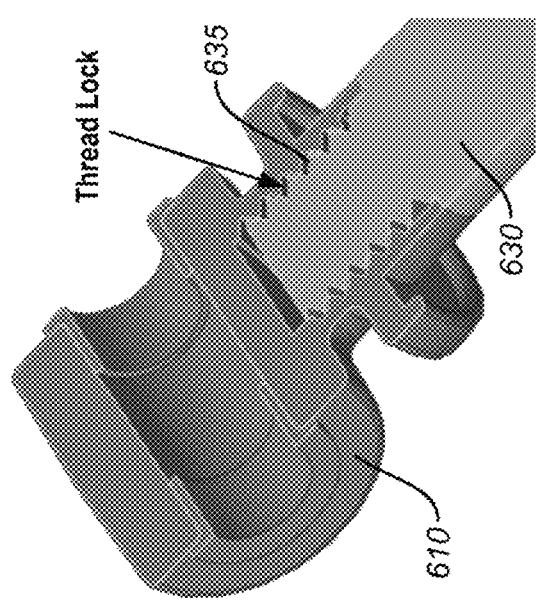
FIG. 10A

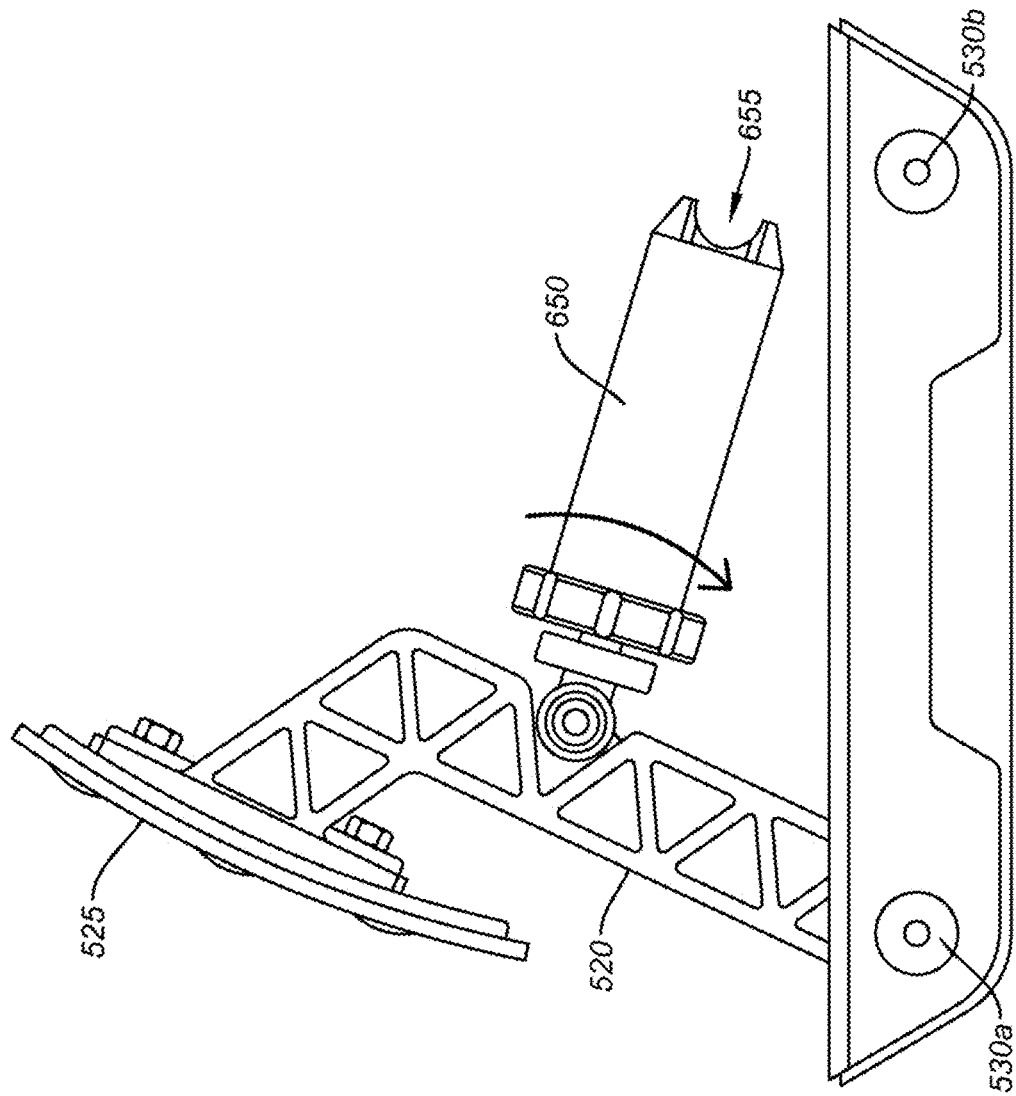

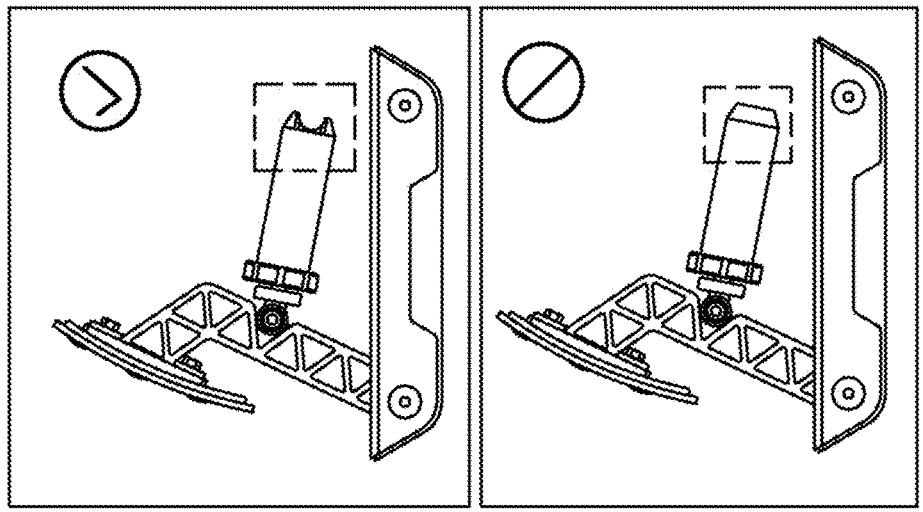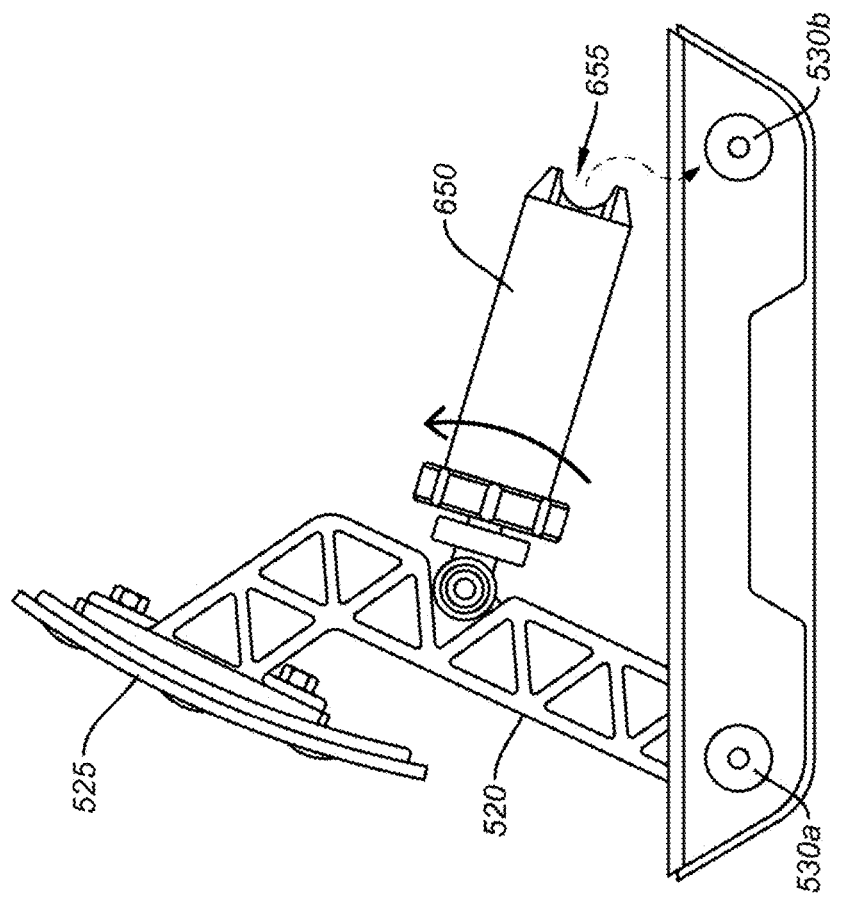
FIG. 15

GAMING PEDAL ASSEMBLY

BACKGROUND

Physical computer peripheral interface devices may include any auxiliary device that can be used as an interface between a user (human) and a computing device. Some examples of computing devices can include a desktop computer, laptop computer, gaming console, entertainment platform, mobile device, or other suitable "host" computing system. Some examples of peripheral devices that are physically manipulated by a human can include computer mice, keyboards, joysticks, steering wheels, gaming pedals, game controllers, presenters, remote controls, smart phones, smart wearables, and the like.

Gaming pedals (also referred to as "gaming pedal systems," "pedal systems," "gaming pedal assembly," "pedal assembly" or the like) are a particular type of peripheral interface device that are often used in conjunction with gaming applications (e.g., driving simulators, flying simulators) to simulate the operation of pedal controls in a real vehicle, such as an automobile, watercraft, or aircraft. For driving simulators, gaming pedals often include an asymmetric set of pedals to simulate accelerator, brake, and clutch pedals in a real automobile. In flight simulators, gaming pedals often include a symmetric set of pedals that simulate rudder controls and toe brakes in an aircraft. Gaming pedals can typically include any suitable type of foot-actuated pedal to electronically control any suitable type of software application.

Gaming pedal systems have undergone a number of advancements and improvements since their inception and continue to be an important accessory (peripheral device) for many users—particularly those in the video gaming community. The realistic physical operation of peripheral devices that resemble their real counterparts can be important for a good user experience "UX" and particularly for those users competing at the top echelons of E-sports competitions. Despite the many advances, more improvements are needed.

It should be noted that unless otherwise indicated herein, the materials described in this section are not prior art to the claims in this application and are not admitted to be prior art by inclusion in this section.

BRIEF SUMMARY

In certain embodiments, a gaming pedal assembly includes a base platform, a pedal arm including a first end rotatably coupled to the base platform at a first mounting location that provides a first axis of rotation for the pedal arm relative to the base platform and a second end including a user interface region, and a piston assembly having a resistance profile. The piston assembly can include a top end rotatably coupled to the pedal arm at a coupling location configured between the first end and second end of the pedal arm that provides a second axis of rotation for the piston assembly relative to the pedal arm. The piston assembly can further include a bottom end rotatably coupled to the base platform at a second mounting location that provides a third axis of rotation for the piston assembly relative to the base platform, where the piston assembly compresses according to the resistance profile of the piston assembly in response to the user interface region of the second end of the pedal arm receiving a pressing force. In some aspects, the piston assembly can further comprise: a cylinder housing, a shaft including a piston that moves linearly within the cylinder housing as the piston assembly is compressed and released, and one or more dampening units configured within the cylinder housing.

In some cases, the piston may press against the one or more dampening units in response to the second end of the pedal arm receiving the pressing force, and the one or more dampening units may provide the resistance profile. The one or more dampening units can be comprised of polyurethane blocks, one or more mechanical springs, foam, sponge, elastomer, or other suitable material, as further described below. The gaming pedal assembly can further comprising a cross pin coupled to the base platform at the second mounting location, the cross pin oriented normal to an orientation of the piston assembly, where the bottom end of the piston assembly is rotatably coupled to the base platform via the cross pin. In some embodiments, the bottom end of the piston assembly forms a saddle-shaped interface, where the cross pin includes a cylindrical portion, and where the saddle-shaped interface of the piston assembly couples to the cylindrical portion of the cross pin in a complementary fit relationship.

In some implementations, the piston assembly includes a quick-release architecture such that the piston assembly couples to the cross pin via a compression fit, where the piston assembly is configured to be decoupled from the cross pin and base platform when the piston assembly is manually compressed enough to overcome the compression fit that separates the saddle-shaped interface from the cylindrical portion of the cross pin. The bottom end of the piston assembly can be rotatably coupled to the base platform at a first location of the cross pin and a strain gauge can be coupled to the cross pin at a second location opposite the first location. The strain gauge can be configured to detect an amount of deformation of the cross pin that corresponds to an amount of force applied to the user interface region. The cross pin can include a number of detents configured to decrease a stiffness of the cross pin causing an increased deformation in response to the amount of force applied to the user interface region. In some aspects, a pedal platform is coupled to the user interface region, the pedal platform shaped as one of a brake pedal platform, accelerator pedal platform, or a clutch pedal platform. The base platform can be fixedly coupled to a chassis configured to house multiple base platforms.

In some embodiments, a gaming pedal system comprises: a base platform including a first cross pin and a second cross pin; a pedal arm including a first end rotatably coupled to the base platform at the first cross pin that provides a first axis of rotation for the pedal arm relative to the base platform and a second end including a user interface region; and a piston assembly having a resistance profile and including a top end rotatably coupled to the pedal arm at a coupling location configured between the first end and second end of the pedal arm that provides a second axis of rotation for the piston assembly relative to the pedal arm and a bottom end rotatably coupled to the base platform via the second cross pin that provides a third axis of rotation for the piston assembly relative to the base platform. In some cases, the piston assembly compresses according to the resistance profile of the piston assembly in response to the user interface region of the second end of the pedal arm receiving a pressing force. In some embodiments, the bottom end of the piston assembly forms a saddle-shaped interface, wherein the cross pin includes a cylindrical portion, and wherein the saddle-shaped interface of the piston assembly couples to the cylindrical portion of the cross pin in a complementary fit relationship.

In certain embodiments, the piston assembly may include a quick-release architecture such that the piston assembly couples to the cross pin via a compression fit, wherein the piston assembly is configured to be decoupled from the cross pin and base platform when the piston assembly is manually compressed enough to overcome the compression fit that separates the saddle-shaped interface from the cylindrical portion of the cross pin. In certain implementations, the piston assembly can further comprise a cylinder housing, a shaft including a piston that moves linearly within the cylinder housing as the piston assembly is compressed and released, and one or more dampening units configured within the cylinder housing. In such cases, the piston may press against the one or more dampening units in response to the second end of the pedal arm receiving the pressing force. The one or more dampening units can provide the resistance profile.

In further embodiments, a pedal system comprises a base platform including a first cross pin and a second cross pin; a pedal arm rotatably coupled to the base platform at the first cross pin; a piston assembly including a top end rotatably coupled to the pedal arm and a bottom end rotatably coupled to the second cross pin; and a strain gauge coupled to the second cross pin and configured to detect an amount of deformation of the cross pin that corresponds to an amount of force applied to the user interface region. In some aspects, the second cross pin can include a number of detents configured to decrease a stiffness of the second cross pin causing an increased deformation in response to the amount of force applied to the user interface region. In some aspects, the bottom end of the piston assembly forms a saddle-shaped interface, wherein the second cross pin includes a cylindrical portion, and wherein the saddle-shaped interface of the piston assembly couples to the cylindrical portion of the second cross pin in a complementary fit relationship. The second cross pin may further include a flat surface opposite the cylindrical portion, and wherein the strain gauge is coupled to the strain gauge on the flat surface.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 10A shows how a t-joint and piston shaft can be coupled, according to certain embodiments.

FIG. 13 shows aspects of a dampener replacement procedure, according to certain embodiments.

FIG. 15 shows aspects of a dampener replacement procedure, according to certain embodiments.

Throughout the drawings, it should be noted that like reference numbers are typically used to depict the same or similar elements, features, and structures.

DETAILED DESCRIPTION

Figure 1:
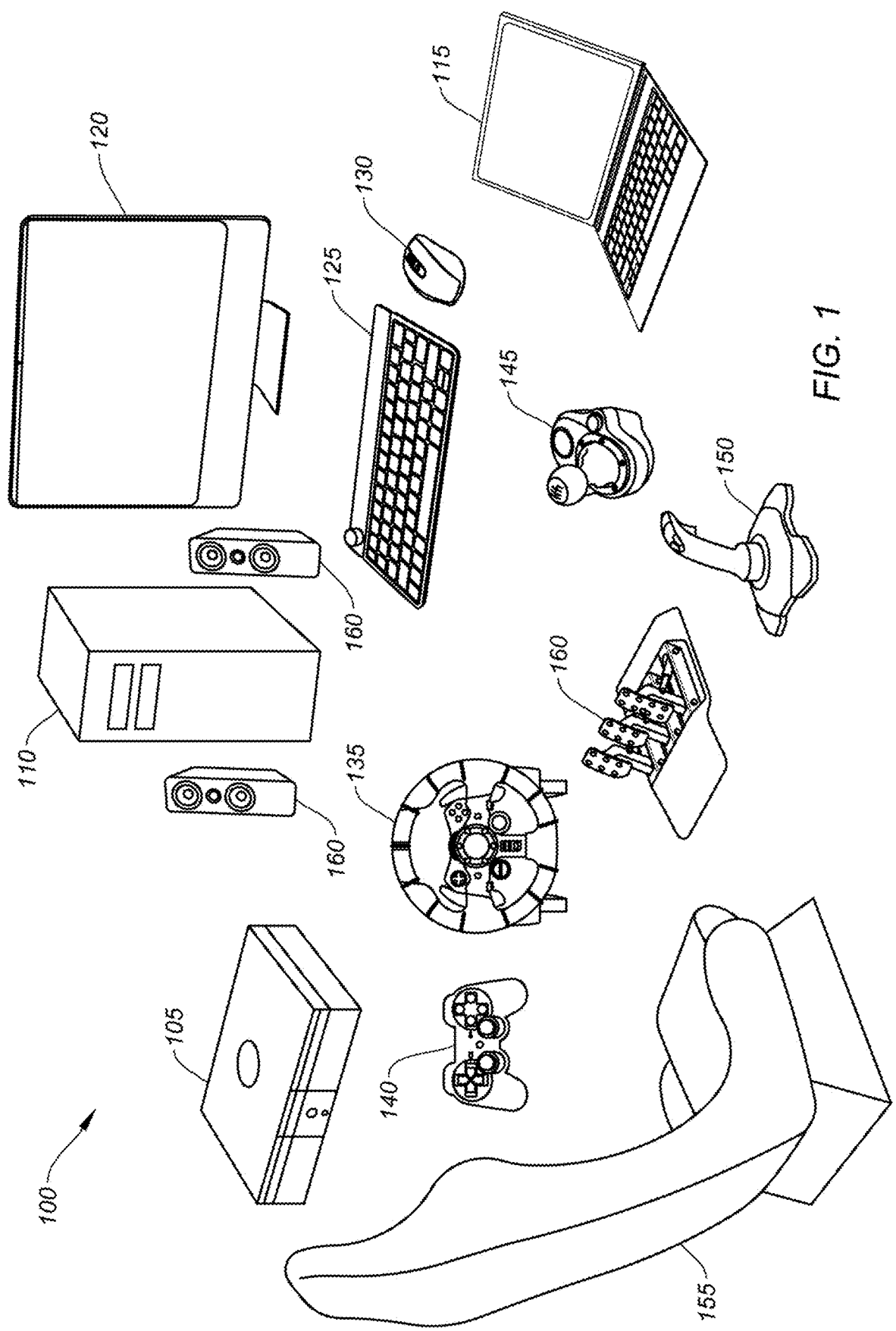
FIG. 1 shows an example of an entertainment system that can include any of a variety of host computing devices and peripheral devices including a gaming pedal, according to certain embodiments.

Aspects of the present disclosure relate generally to computer peripheral devices, and more particularly to gaming pedal systems, according to certain embodiments.

In the following description, various examples of gaming pedal systems are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to a gaming pedal system that can be used in conjunction with a number of software applications, which can typically include vehicle simulators (e.g., automobile, naval vessel, and aircraft simulators). The gaming pedal system (e.g., see FIG. 3A) may include multiple pedals (e.g., accelerator, brake, clutch) that can each provide a realistic resistance profile that simulates how a real corresponding pedal feels when depressed by a user. Some users may be particular about how they want the resistance profile to file. Some contemporary pedal systems allow a user to tune their resistance profile, but the process can be complicated, onerous, involve special tools and expertise, and is often very time consuming. Aspects of the invention resolve this technical problem with a technical solution that includes providing a novel quick-change assembly (e.g., piston assembly) that allows a user to rapidly change a resistance profile of the pedal (e.g., brake, accelerator, clutch) by hand with no special tools or equipment in less than a minute (see, e.g., FIGS. 12-16).

By way of example, some embodiments may include a gaming pedal assembly comprising a base platform and a pedal arm including a first end rotatably coupled to the base platform at a first mounting location that provides a first axis of rotation for the pedal arm relative to the base platform, and a second end including a user interface region. The gaming pedal can include a piston assembly having a resistance profile and including a top end rotatably coupled to the pedal arm at a coupling location configured between the first end and second end of the pedal arm that provides a second axis of rotation for the piston assembly relative to the pedal arm, and a bottom end rotatably coupled to the base platform at a second mounting location that provides a third axis of rotation for the piston assembly relative to the base platform. The piston assembly can be compressed according to the resistance profile of the piston assembly in response to the user interface region of the second end of the pedal arm receiving a pressing force. The piston assembly may include a cylinder housing, a shaft including a piston that moves linearly within the cylinder housing as the piston assembly is compressed and released, one or more dampening units (e.g., polyurethane blocks, mechanical spring, etc.) configured within the cylinder housing wherein the piston presses against the one or more dampening units in response to the second end of the pedal arm receiving the pressing force, and the one or more dampening units provide the resistance profile. In some embodiments, the pedal arm may have multiple coupling locations including, for instance, anchor point 524 described below, and one or more additional anchor points positioned above and/or below anchor point 524. Such embodiments can allow a user to change certain performance characteristics (e.g., resistance profile) of the particular pedal based on the coupling location of the pedal arm and biasing mechanism (e.g., piston assembly), as well as the dampening units as further described below.

Another technical problem with contemporary gaming pedal systems includes the inaccurate detection of pedal displacement and/or force applied to the pedal, which is typically due to a number of factors including sensor placement and implementation. Aspects of the present invention provide a technical solution to this problem with certain embodiments having strain gauge sensor(s) incorporated into the pedal assembly (e.g., on the cross pin) in a manner that provides more reliable, repeatable, and accurate measurements due to a novel cross-pin having structural modifications that provide improved performance characteristics (see, e.g., FIGS. 18-20). By way of example, in some embodiments the gaming pedal assembly may include a cross pin coupled to the base platform at the second mounting location, the cross pin oriented normal to an orientation of the piston assembly, where the bottom end of the piston assembly is a saddle shaped interface and rotatably coupled to the base platform via the cross pin. The cross pin can include a cylindrical portion and the saddle-shaped bottom portion of the piston assembly couples to the cylindrical portion of the cross pin in a complementary fit relationship that can allow for quick decoupling when the piston assembly is manually compressed enough to overcome the compression fit that separates the saddle-shaped interface from the cylindrical portion of the cross pin. In such embodiments, a strain gauge can be coupled to the cross pin at a second location opposite the first location and configured to detect an amount of deformation of the cross pin that corresponds to an amount of force applied to the user interface region. The cross pin may include a number of detents configured to decrease a stiffness of the cross pin causing an increased deformation in response to the amount of force applied to the user interface region. These and other novel concepts are further described in the embodiments the follow.

FIG. 1 shows an example of an entertainment system 100 that can include any of a variety of host computing devices and peripheral devices including a gaming pedal, according to certain embodiments. A typical host computing device as described herein can include any of a gaming system 105, a desktop computer 110, a laptop computer 115, or any other suitable host computing device (e.g., entertainment system, set top box, smart phone, smart wearable, or the like). A typical peripheral device can include any of a keyboard 125, computer mouse 130, gaming steering wheel 135, game controller 140, shifter 145, joystick 150, gaming chair 155, gaming pedal system 160, or other suitable peripheral device (e.g., presenter device, remote control, headphones, haptic-enabled wearables such as gloves, clothing, etc., virtual and/or augmented reality controllers such as stylus devices and/or 3/6 degree-of-freedom controllers, pedals, or the like).

A host computing device may be referred to herein as a "host computer," "host device," or the like, and may include a machine readable medium (not shown) configured to store computer code, such as driver software, firmware, and the like, where the computer code may be executable by one or more processors of the host computing device to control the one or more peripheral input devices.

A peripheral input device may be referred to as an "input device," "peripheral device," or the like. It should be understood that although the majority of embodiments depicted herein are focused on applications involving gaming pedal systems, those of ordinary skill in the art would understand how to adapt the concepts applied to non-gaming related applications. For instance, embodiments of the gaming pedal systems described herein could be used to control electric vehicles (e.g., control signals from the gaming pedal system could be used to modulate an acceleration or braking implementation, etc.).

In the descriptions for some embodiments, system 100 may generally referred to as desktop or laptop computing device. However, it should be understood that system 100 can be any suitable computing device further including a tablet computer, a smart phone, a virtual or augmented reality interface (e.g., having 2D or 3D displays), a holographic interface, a controller for an instrument, or the like. One of ordinary skill in the art would understand the many variations, modifications, and alternative embodiments thereof.

Figure 2:
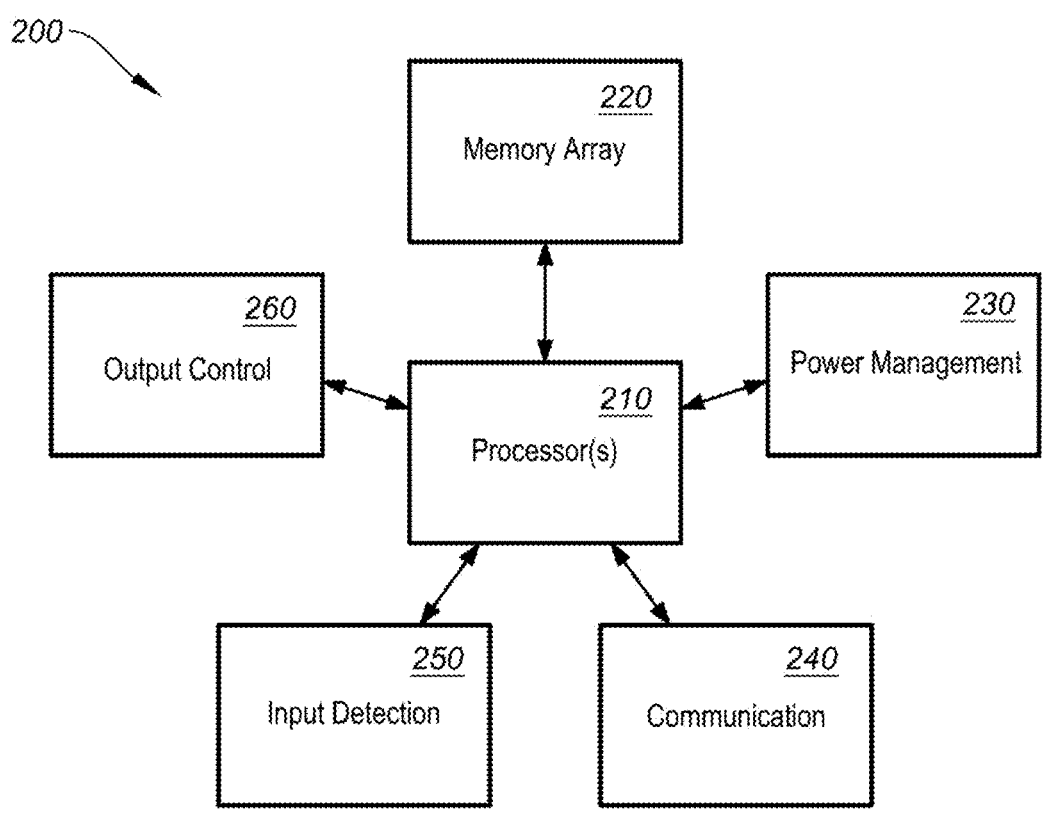
FIG. 2 shows a system block diagram configured for operating a peripheral input device (e.g., gaming pedal), according to certain embodiments.

FIG. 2 shows a system 200 for operating a peripheral input device (e.g., gaming pedal system 160), according to certain embodiments. System 200 may include processor(s) 210, memory 220, a power management system 230, a communication system 240, an input detection module 250, and an output control module 260. Each of the system blocks 220-260 can be in electrical communication with the processor(s) 210 (e.g., via a bus system). System 200 may also include additional functional blocks that are not shown or discussed to prevent obfuscation of the novel features described herein. System blocks 220-260 may be implemented as separate modules, or alternatively, more than one system block may be implemented in a single module. In the context described herein, system 200 can be incorporated into a gaming pedal system 160, as shown and described at least with respect to FIGS. 1 and 3-20. As further described below, aspects of system 2000 may be incorporated in full or in part into system 200 or vice versa (e.g., processor 2020 may correspond to processor(s) 210).

In certain embodiments, processor(s) 210 may include one or more microprocessors and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of input device 135 (e.g., system block 220-260). Alternatively or additionally, some of system blocks 220-260 may include an additional dedicated processor, which may work in conjunction with processor(s) 210. Processor(s) 210 may be local to the peripheral device (e.g., contained therein), may be external to the peripheral device (e.g., off-board processing, such as by a corresponding host computing device), or a combination thereof). As further described below, processor 2020 of FIG. 20 may be the same as processor 210, or may work in conjunction with processor 210. One of ordinary skill in the art would understand the many variations, modifications, and alternative embodiments that are possible.

Memory 220 may be configured to store information pertaining to one or more operational configurations of input device 135. As further discussed below, one or more operational configurations of input device 135 may include setting performance characteristics of gaming pedal system 160, including but not limited to, user settings that control haptic feedback, lighting schemas, or other electrical properties. In some cases, memory 220 may include a saved calibration setting for one or more strain gauges and/or load cells on the gaming pedals (e.g., brake, accelerator, clutch) of the gaming pedal system 160. Note that a strain gauge is a sensor and a load cell may be a transducer (e.g., a sensor plus a deforming material, such as the pedal arm)

Additionally, memory 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

Power management system 230 can be configured to manage power distribution, recharging, power efficiency, haptic motor power control (e.g., output scaling, as further described below at least with respect to FIGS. 3-5), and the like, for input device 135. In some embodiments, power management system 230 can include a battery (not shown), a USB based recharging system for the battery (not shown), and power management devices (e.g., voltage regulators—not shown). In certain embodiments, the functions provided by power management system 230 may be incorporated into processor(s) 210. The power source can be a replaceable battery, a rechargeable energy storage device (e.g., super capacitor, Lithium Polymer Battery, NiMH NiCd), or a corded power supply. The recharging system can be an additional cable (specific for the recharging purpose) or it can use a USB connection to recharge the battery.

Communications system 240 can be configured to provide wireless communication with a corresponding host computing device (e.g., 105, 110, 115), or other devices and/or peripherals, according to certain embodiments. Communications system 240 can be configured to provide radio-frequency (RF), Bluetooth®, infra-red (IR), ZigBee®, or other suitable communication technology to communicate with other computing devices and/or peripheral devices. System 200 may optionally comprise a hardwired connection to the corresponding host computing device. For example, input device 135 can be configured to receive a Universal Serial Bus (USB) cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 150, output control modules 260, etc.).

Input detection module 250 can control the detection of a user-interaction with input elements on input device 160. For instance, input detection module 250 can detect user inputs caused by pressing one or more pedals on the gaming pedal system (e.g., brake, accelerator, clutch, etc.), or other suitable input elements or devices such as a buttons, touch sensors (e.g., touch pads), switches, and the like. In some cases, input element on gaming pedal system 160 may be ergonomically configured to be controllable with a user's foot. In some embodiments, input detection module 250 can work in conjunction with memory 220 to detect inputs on input device 160 and associate various functions with each input element (e.g., measuring pedal deflection). In some aspects, input detection module may include one or more strain gauges and/or load cells to detect how hard a user is pressing the one or more pedals in a gaming pedal as further described below with respect to FIGS. 18-20.

In some embodiments, output control module 260 can control various outputs for a corresponding peripheral input device. For instance, gaming pedal system 160 may include a number of LEDs, displays, audio outputs (e.g., speakers), haptic effect capabilities, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any peripheral device. Further, system 200 can be applied to any of the input devices described in the embodiments herein, whether explicitly, referentially, or tacitly described (e.g., would have been known to be applicable to a particular input device by one of ordinary skill in the art). The foregoing embodiments are not intended to be limiting and those of ordinary skill in the art with the benefit of this disclosure would appreciate the myriad applications and possibilities.

Figure 3A:
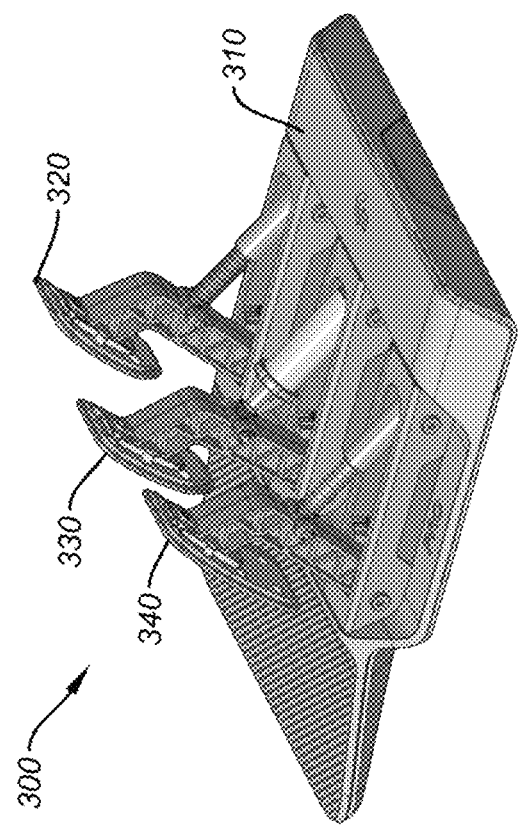
FIGS. 3A and 3B show a gaming pedal assembly including a number of pedals, according to certain embodiments.
Figure 3B:
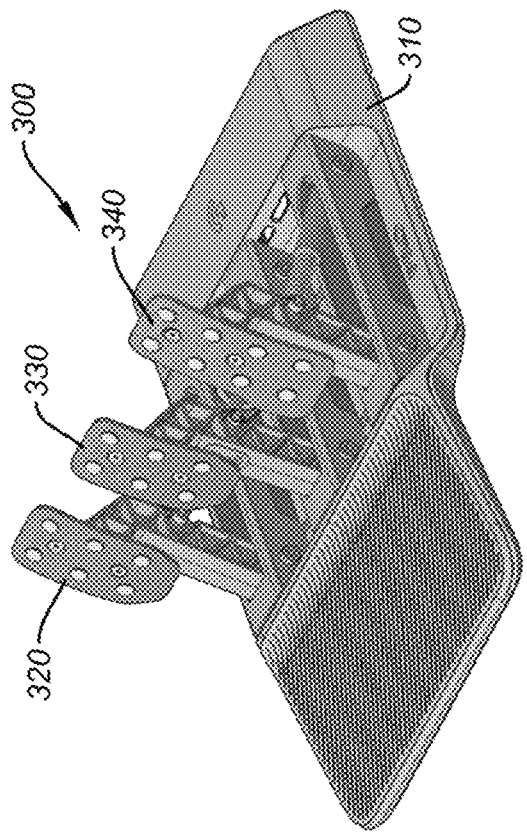

FIGS. 3A and 3B show a gaming pedal system 300 including a number of pedals, according to certain embodiments. Gaming pedal system ("pedal system" or "gaming pedal assembly") 300 can be a computer peripheral device for any host computer (e.g., desktop/laptop computer, gaming console, etc.) typically configured to operate as a foot-controlled input device. In some implementations, game pedal system 300 can be used in conjunction with a driving simulator software application (or naval, flight, or other suitable mobile craft) operating on a host computer (110) and can provide a realistic simulation of how an automobile pedal assembly would feel, including the particular operational resistance curves provided by an accelerator, brake, and clutch pedal in a real vehicle. Furthermore, gaming pedal system 300 can include a quick change assembly that can allow a user to rapidly change a resistance profile for each pedal, which may involve swapping out various biasing mechanisms including elastomers (e.g., polyurethane), mechanical springs, or the like, in an easy and intuitive manner, which is further described below. Moreover, gaming pedal system 300 may incorporate accurate force detection and pedal displacement sensing using a number of novel innovations as detailed below.

Gaming pedal system 300 can include a chassis (also referred to as a "floor chassis" or "base chassis") 310 and a number of pedal modules including clutch module 320, brake module 330, and accelerator module 340. It should be understood that although the various embodiments described herein are generally directed to automobile pedals, other pedal types with different pedal functions may be used, such as rudder control, braking, and steering pedals in an aircraft. One of ordinary skill in the art with the benefit of this disclosure would appreciate the many modifications, variations, and alternative embodiments thereof.

Chassis 310 may be constructed of a strong and preferably heavy material (e.g., steel, aluminum) and/or contain a relatively heavy ballast so that the gaming pedal system does not move along an underlying surface as a user applies force to the pedals. In some embodiments, the chassis is typically 3-4 kg, each pedal module may weigh approximately 650-750 g, and the full assembly (e.g., chassis with 3 pedal modules) may weigh approximately 5-6 kg. Other weights (e.g., heavier or lighter) are possible for the chassis, pedal modules, or any feature, component, etc., of the gaming pedal systems described herein. Each of the pedal modules can be fixedly coupled to chassis 310 in any suitable manner (e.g., screws, pins, bolts, slots, friction fit, etc.), and preferably one that firmly secures the pedal module to the chassis at any of available pedal module receiving location on chassis 310 (e.g., where a pedal module can be placed—there are three shown on gaming pedal system 300). Each of the pedal modules may include a common pedal assembly with differing biasing systems such that the pedal modules may be modular and interchangeable on chassis 310. For instance, some embodiments may switch the location of brake and clutch pedal per user preference. In some cases, a user may only want an accelerator and brake implementation for vehicle simulators using an automatic transmission controlled drive train.

Each pedal module may incorporate common components (referred to as a "base module") across each type of pedal (e.g., clutch, brake, accelerator, rudder, steering, etc.) for many applying many different applications and modifications. For example, each pedal module may include a base platform (e.g., 410), pedal arm (e.g., 420), and one or more cross pins that can each provide an axis of rotation for the pedal arm and corresponding quick-change biasing module (e.g., piston assembly 540) based on the type of pedal module, which may include a piston assembly with elastomeric biasing mechanisms, hardware based biasing mechanisms, or the like, as further described in greater detail below. Brake module 330 is most frequently described throughout this disclosure, although it should be understood that many of the novel concepts described herein can be applied to other types of pedals, as would be appreciated by one of ordinary skill in the art with the benefit of this disclosure. Chassis 310 may house additional componentry including electronics (e.g., systems 200, 2000), hardware (e.g., wiring harnesses), or other details not described as to prevent the obfuscation of the novel concepts presented herein, but as would be appreciated by one of ordinary skill in the art with the benefit of this disclosure.

Figure 4B:
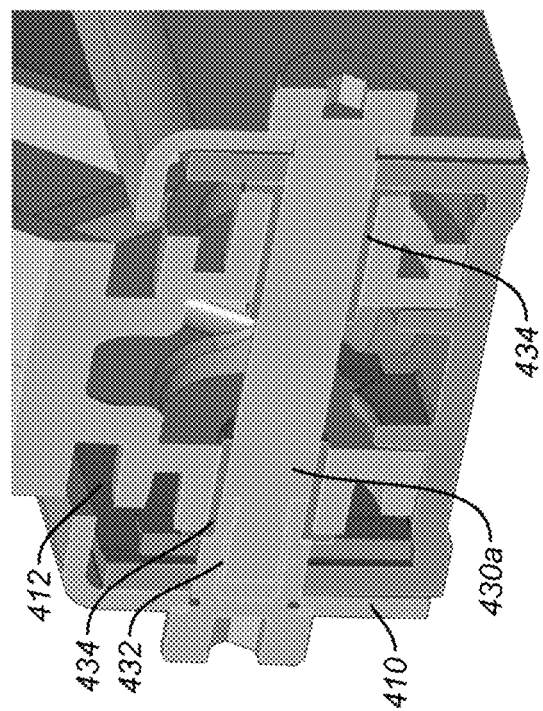
FIG. 4B shows a cross-section of certain aspects of the base module, according to certain embodiments.
Figure 4A:
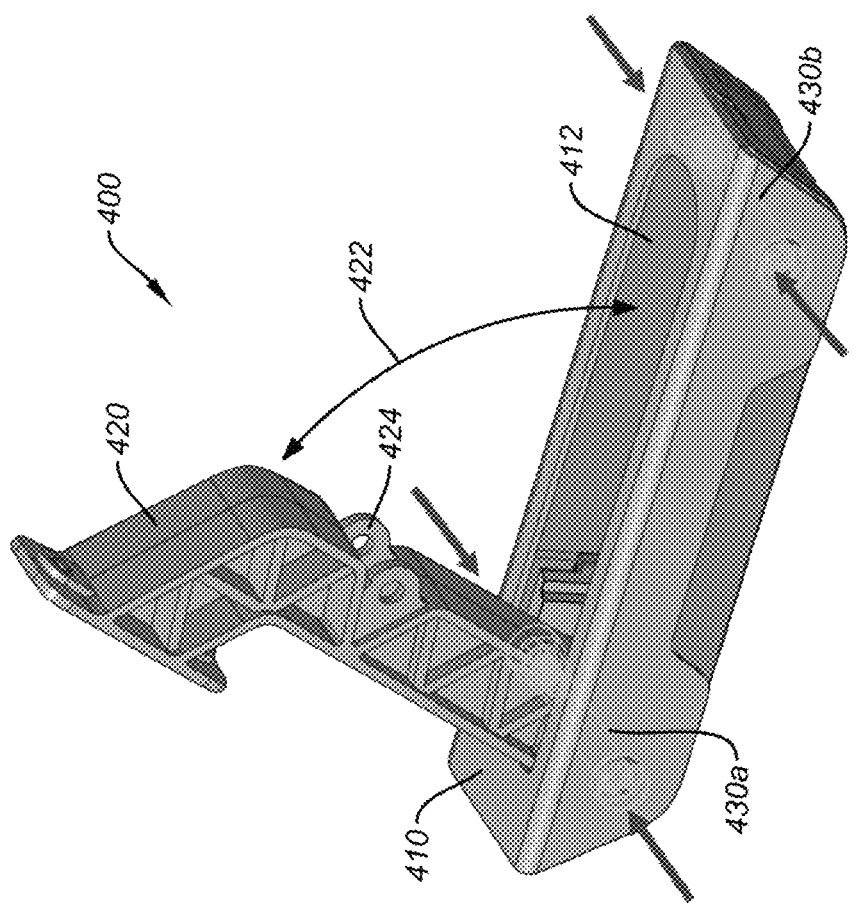
FIG. 4A shows aspects of a base module common to multiple pedal types, according to certain embodiments.

FIG. 4A shows aspects of a base module 400 common to multiple pedal types, according to certain embodiments. The components of pedal module 400 can include a base platform 410, pedal arm 420, and cross pins 430*a* and 430*b*. Base platform 410 may be configured to be fixedly coupled to chassis 310 (at any available pedal module location) by any suitable coupling means (e.g., screws, bolts, slotted/friction fit, etc.). Pedal arm 420 may include a first end and second end, with the first end rotatably coupled to base platform 410 at a first mounting location (e.g., cross pin 430*a*) that provides a first axis of rotation for the pedal arm relative to the base platform, as shown in part by arc 422. That is, cross pin 430*a* can operate like an axle with pedal arm 420 rotating along the axis defined by cross pin 430*a*. The second end of pedal arm 420 may be coupled to a pedal platform (e.g., brake pedal platform), which is typically the interface wherein a user provides the user input to the pedal module by pushing on the pedal platform. A pedal platform (not shown) is not necessarily needed for operation of the pedal module, however it can provide more surface area for the user to comfortably provide a force to depress the pedal. It should be noted that pedal platforms may also be referred to as "user interface regions" as a user typically applies a force on the pedal platform with their foot. It should also be noted that cross pins 430*a* and 430*b* (as well as their equivalent counterparts—e.g., 530*a* and 530*b*) is also referred to herein as a "first" cross pin (e.g., 430*a*, 530*a*) and a "second" cross pin (e.g., 430*b*, 530*b*, 1800).

Pedal arm 420 may include a coupling location (anchor point) 424 that is configured between the first end and the second end of the pedal arm that provides a second axis of rotation for a biasing module (e.g., piston assembly—further described below; note that the biasing modules typically differ between pedal modules and are typically not part of the common base module) relative to the pedal arm. Cross pin 430*b* may be configured to be coupled to an opposite end of the biasing module to provide a third axis of rotation for the biasing module relative to the base platform. In some aspects, the biasing module may rotate very little relative to cross pin 430*b*. For example, in some embodiments, an angle between the biasing module (e.g., piston assembly) may vary between about 31.5° and 28.78°, for about 3.7° of rotation. Some embodiments may rotate less (e.g., approximately 2.5°) or more, as would be appreciated by one of ordinary skill in the art with the benefit of this disclosure.

Figure 18:
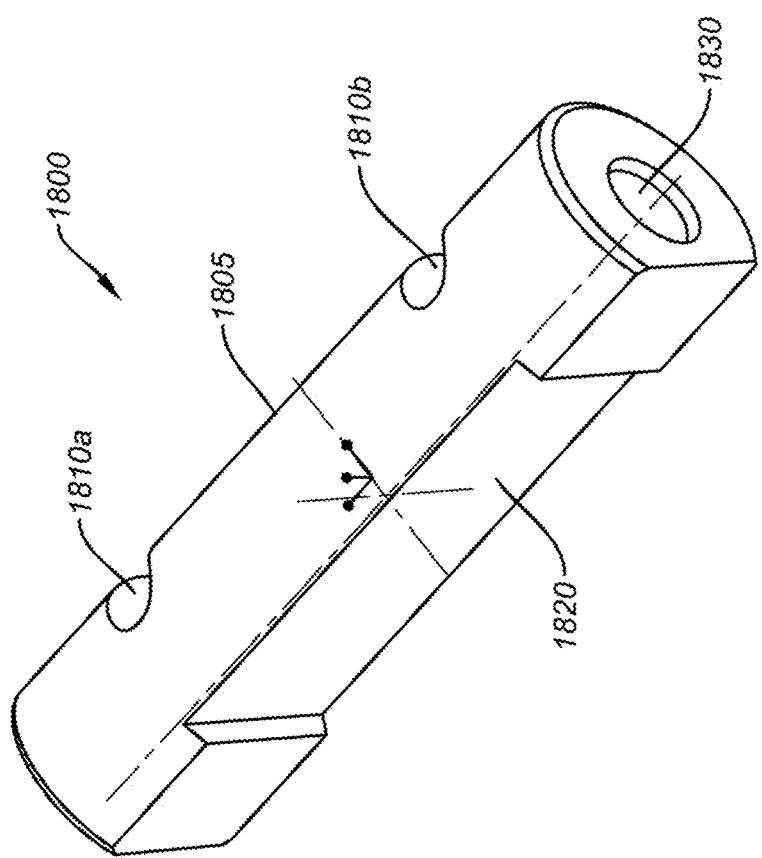
FIG. 18 shows aspects of a cross pin for a gaming pedal assembly, according to certain embodiments.

As indicated above, base module 400 may be common to each pedal type and therefore can operate in a modular fashion. For example, a user may move base module 400 from one location on chassis 300 to another. In some cases, a pedal platform and biasing module can be swapped out so that the pedal operate with a different resistance profile, as further described below. In such cases, force sensing and brake deflection detection may have to be modified to a corresponding configuration (e.g., so that an accelerator operates both physically and electronically like an accelerator instead of a clutch or brake). However, cross pin 430*b* may differ between certain implementations. For example, base module 400 configured as a brake pedal (e.g., as shown in FIG. 5) may use cross pin as shown in FIG. 18, while clutch or accelerator implementations may use a cross pin not configured with a similarly positioned strain gauge sensor. One of ordinary skill in the art with the benefit of this disclosure would appreciate the many modifications, variations, and alternative embodiments thereof.

In some embodiments, the base module may be a standalone module. For instance, the base module may rest on a surface rather than chassis 310. In such cases, suitable adaptations to the base module would likely be made to ensure sufficient weight and stability for a good user experience.

FIG. 4B shows a cross-section of certain aspects of pedal module 400, according to certain embodiments. Specifically, FIG. 4B shows a cross-section of cross pin 430*a* coupled to base platform 410. In some aspects, cross pin 430*a* may be fixedly coupled to base platform 410 by any suitable means. Referring to FIG. 4B, cross pin 430*a* can be a single piece or screw and nut assembly with threading 432 for a secure thread-fit coupling. Other methods of coupling together cross pins 430*a* and 430*b* are possible (e.g., friction fit, latches, etc.), as would be appreciated by one of ordinary skill in the art with the benefit of this disclosure. In some cases, pedal arm 420 may rotate relative to cross pin 430*a* by one or more bearings 434 as shown, or other mechanical means of promoting a smooth rotation of pedal arm 420 relative to cross pin 430*a* at the axis of rotation provided by cross pin 430*a*. Base platform 410 typically includes a trough 412 that the pedal arm rotates within along arc 422. In some cases, cross pin 430*a* may pass through a hole in pedal arm 420, as shown in FIG. 4B.

Cross pin 430*b* may be configured within base platform 410 in a similar manner as cross pin 430*a*. However, the coupling relationship between cross pin 430*b* and the biasing module (e.g., piston assembly 540) may be configured in a manner that allows the biasing module to be quickly decoupled, which is typically a complementary fit relationship between a cylindrical portion of the cross pin and a saddle shaped ("u-shaped") interface at the end of the biasing module that couples to the cross pin, as further described below. Cross pins 430*a* and 430*b* are typically installed on base platform 410 normal to an orientation of pedal arm 420 and extending along a width of base platform 410, as shown in FIGS. 4A and 4B.

Figure 5:
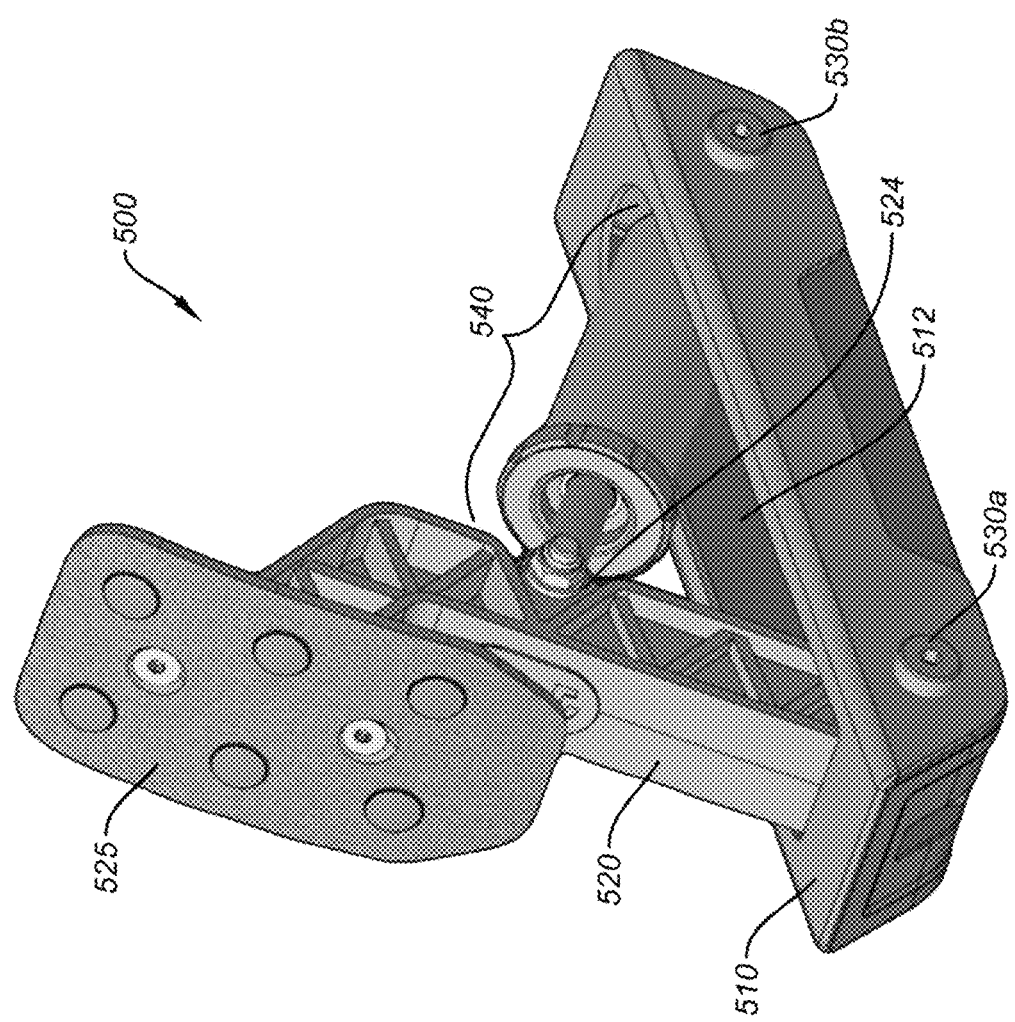
FIG. 5 shows a base module configured as a brake pedal, according to certain embodiments.

FIG. 5 shows pedal module 500 configured as a brake pedal, according to certain embodiments. Pedal module 500 operates and feels like a brake pedal as opposed to another type of pedal (e.g., accelerator, clutch) due in large part to the type of biasing mechanism being used. Pedal module 500 can include a base platform 510, a pedal arm 520, and a biasing mechanism 540 configured as a piston assembly. A first end of pedal arm 520 can be coupled to cross pin 530*a* (e.g., a first mounting location), which can provide an axis of rotation for pedal arm 520 to rotate within trough 512 of base platform 510. A second end of pedal arm 520 can be coupled to a pedal platform 525 that may be configured to look like a brake-type pedal platform. Biasing mechanism 540 ("piston assembly 540") can be compressed according to a particular resistance profile that simulates how a brake could feel in the type of vehicle being modeled (e.g., a high performance automobile). A top end of piston assembly 540 can be coupled to pedal arm 520 at a coupling location configured between the first end and the second end, such as at anchor point 524, which provides a second axis of rotation for the piston assembly relative to the pedal arm. A bottom end of piston assembly 540 can be coupled to base platform 510 at cross pin 530*b* (e.g., a second mounting location) that provides a third axis of rotation for piston assembly 540 to rotate relative to base platform 510. In operation, as the pedal arm is pressed (e.g., by a user's foot), the pedal arm rotates downwards (e.g., see arc 422 of FIG. 4A) and compresses piston assembly 540 according to the resistance profile provided by the dampening units, as further described below. Base platform 510, cross pins 530*a* and 530*b*, and pedal arm 520 may form a base module that can be common to any pedal type, as further described above with respect to FIGS. 4A-4B. Pedal module 500 may be coupled to a chassis (e.g., chassis 310).

Although many of the embodiments shown herein include a single coupling location (e.g., anchor point 524), it should be noted that some embodiments may incorporate multiple coupling locations positioned above and/or below anchor point 524. Such embodiments can allow a user to change certain performance characteristics (e.g., resistance profile) of the particular pedal based on the coupling location of the pedal arm and biasing mechanism (e.g., piston assembly), as would be appreciated by one of ordinary skill in the art with the benefit of this disclosure.

Figure 6A:
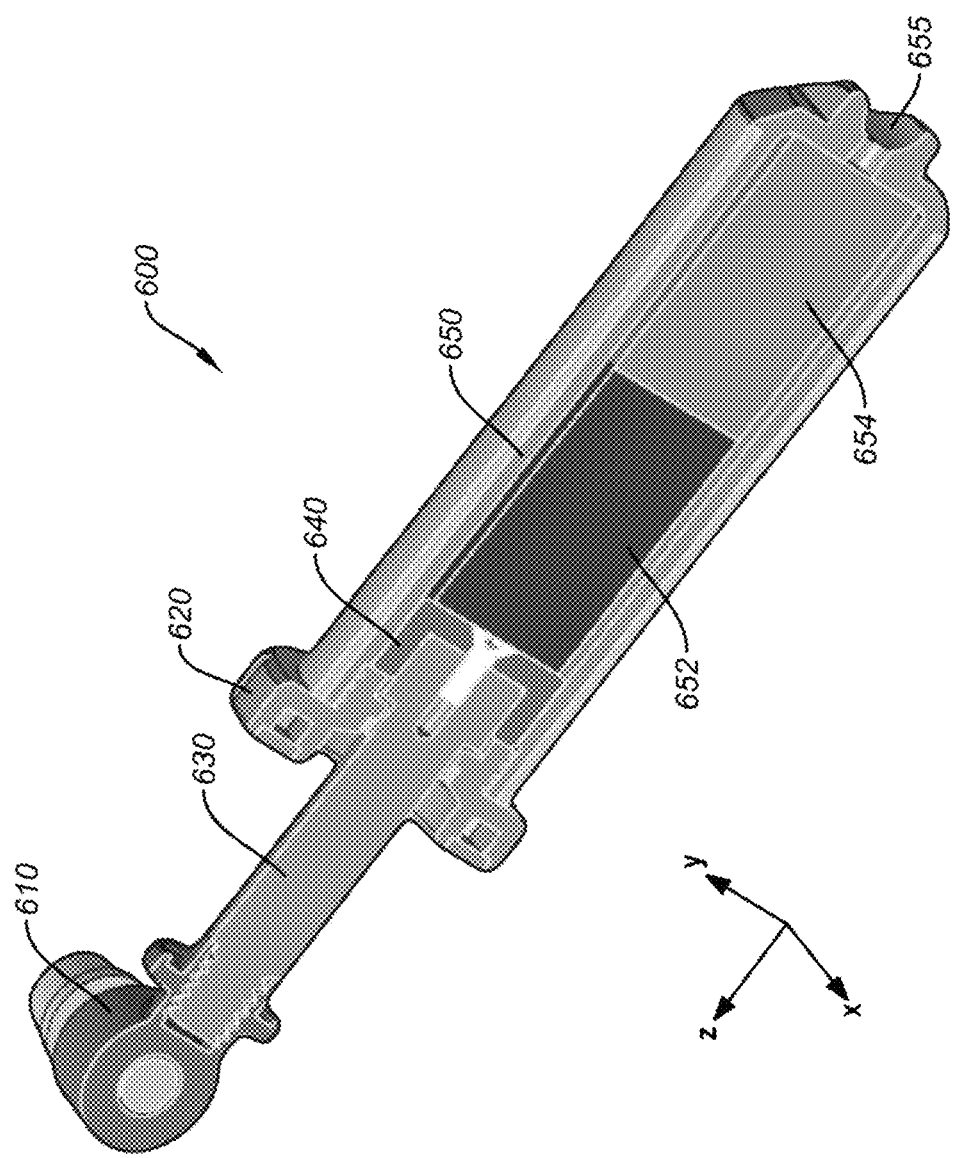
FIG. 6A shows a cross-section of a piston assembly for the pedal module, according to certain embodiments.
Figure 6B:
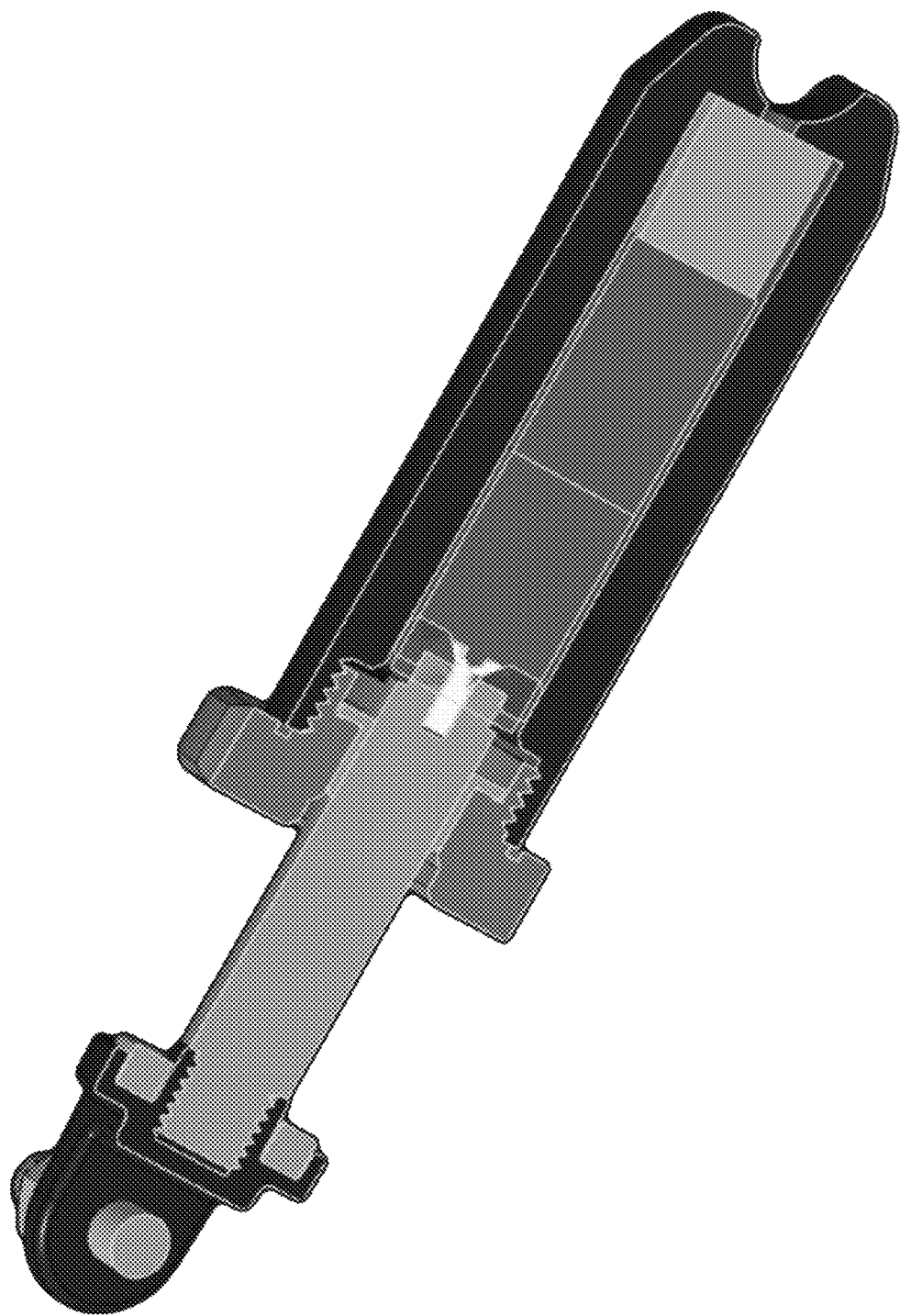
FIG. 6B shows a cross-section of another piston assembly for the pedal module, according to certain embodiments.

FIG. 6A shows a cross-section of a piston assembly 600 for a pedal module, according to certain embodiments. Piston assembly 600 can be compressed according to a resistance profile provided by a number of dampening units housed within a piston housing. Piston assembly 600 may include a t-joint 610, a piston shaft 630, a piston cap upper 620, a bearing cap 640, a piston housing 650, dampening units 652, 654, and cross pin interface 655. Cartesian coordinates 605 are provided for reference. Some embodiments (piston assembly 680) may incorporate additional bearings (682) for smoother/improved operation and/or dampening units (652, 654, 656), as shown in FIG. 6B, and as would be appreciated by one of ordinary skill in the art with the benefit of this disclosure.

T-joint 610 is configured at a top end of piston assembly 600 and can be the mechanism that couples piston assembly 600 to pedal arm 520 (e.g., at anchor point 524), which provides an axis of rotation for the piston assembly relative to the pedal arm. T-joint 610 is fixedly coupled to piston shaft 630 in a complementary threaded fit arrangement, however other methods of coupling are possible (e.g., compression fit, hardware (e.g., screws, bolts, pins, etc.) adhesive, ultrasonic weld, etc.). T-joint 610 is further described below with respect to FIG. 7. Piston cap upper 620 can be coupled to piston shaft 630 and bearing cap 640 by any suitable coupling method (e.g., threaded fit, hardware, adhesive, ultrasonic weld, etc.), which form a piston pin subassembly. FIG. 8A shows a cross-section of piston cap upper 620 including bearings 622 (e.g., press fit). Note that the several references to bearings in this disclosure can mean bushings as well. The piston pin sub-assembly can be coupled to piston housing 650 in a complementary threaded fit arrangement as shown to allow for a quick release architecture, as further described below at least with respect to FIGS. 12-15. Alternatively, other methods of coupling are possible (e.g., compression fit, hardware (e.g., screws, bolts, pins, etc.) adhesive, ultrasonic weld, push-push such as spring loading, etc.). Piston housing 650 may include a sleeve on the exterior for decorative effect, but is not necessary for the proper operation of piston assembly 600. Dampening units 652, 654 can be disposed within piston housing 650 and may be comprised of any suitable material to provide a resistance profile when the piston assembly is compressed. Dampening units 652, 654 ("the dampeners") can be comprised of any suitable elastomer material (e.g., polyurethane) having varying densities that can provide a range of resistance profiles, as further described below with respect to FIGS. 14A and 14B. In some embodiments, other types of dampening units can be used, such as hardware-based implementations (e.g., springs) or the like. A bottom end of the piston assembly includes a cross pin interface 655 that rotatably couples piston assembly 600 to base platform 510 at cross pin 530b and provides an axis of rotation (e.g., like an axle) for the piston assembly relative to the base platform. Cross pin interface 655 may be configured in a saddle-shaped contour (also described as a u-shaped contour) that couples to cross pin 530b in a complementary fit relationship where the u-shape of the cross pin interface 655 fits on a cylindrical portion of cross pin 530b.

Figure 12:
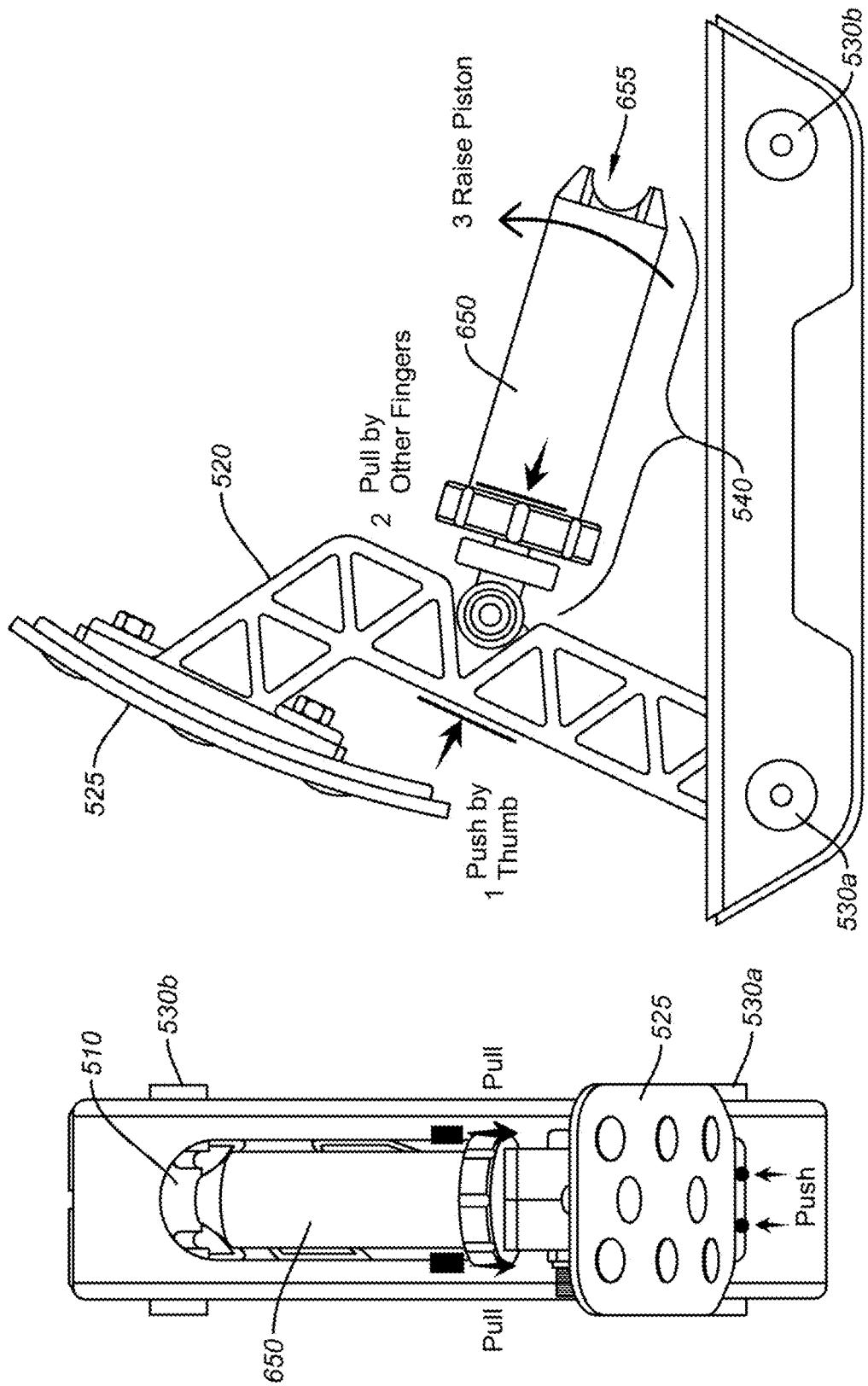
FIG. 12 shows aspects of a dampener replacement procedure, according to certain embodiments.
Figure 14A:
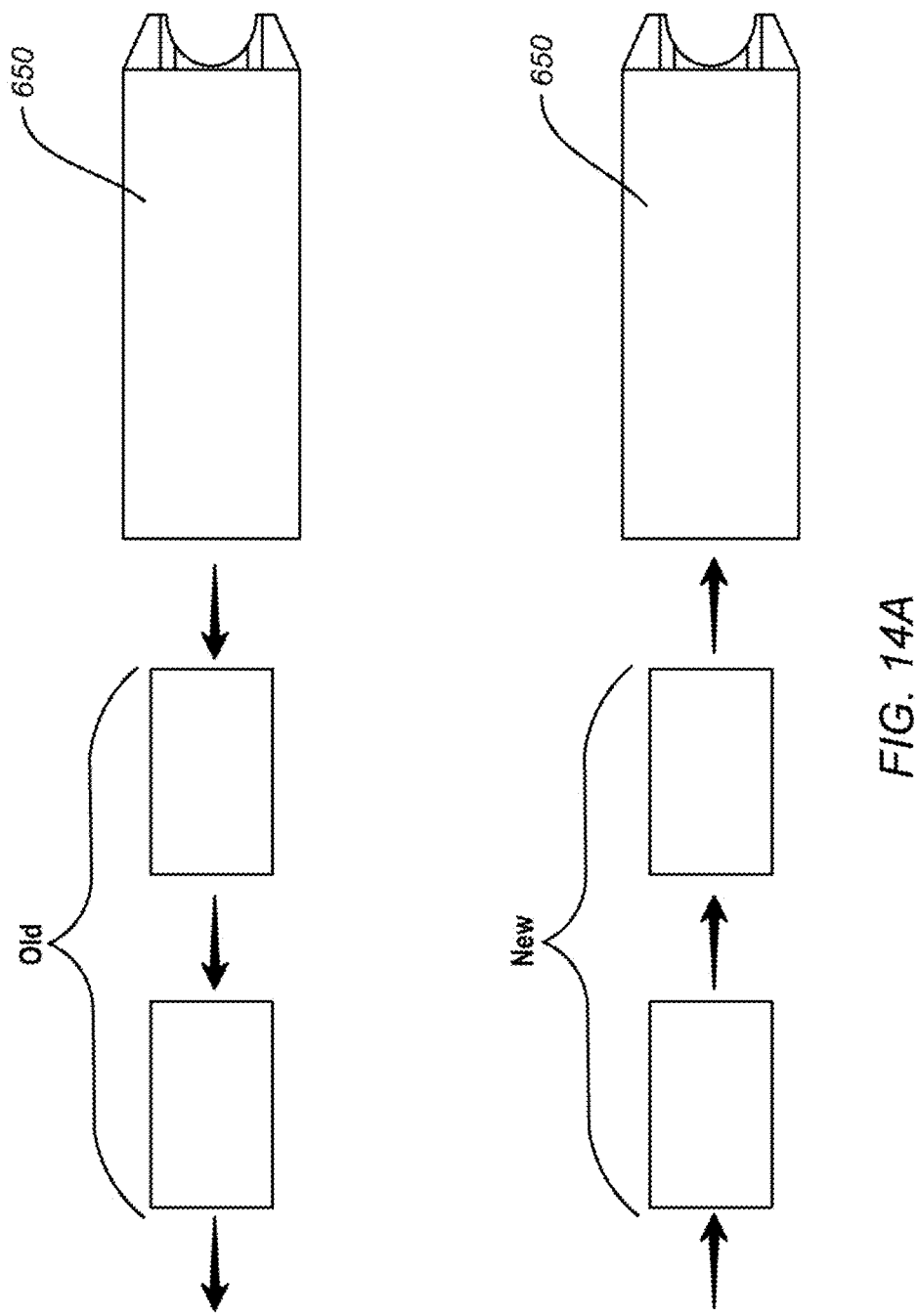
FIG. 14A shows aspects of a dampener replacement procedure, according to certain embodiments.

In some embodiments, there may be a gap between the dampeners and the inner portion of piston housing 650 when piston assembly 540 is at rest, which can include when piston assembly 540 is disconnected from cross pin 530b (as shown in FIG. 12) and/or when piston assembly 540 is coupled to cross pin 530 but no external force is being applied to the brake module (e.g., no user-provided for on the pedal arm; no compression of piston housing 650). That is, the dampeners may have a small enough diameter (thereby a gap (e.g., 1-2 mm or other suitable gap) exists between the dampeners and at least a portion of the inner wall of piston housing 650) that they loosely fit inside piston housing 650 and can easily slide in and out when the piston assembly is taken apart (as shown in FIG. 14A), which can make swapping out dampening units easy for the user. A further advantage of the small gap is that when the dampening units are compressed, their diameter may increase until they fill the gap in the piston housing. This can result in the dampening unit's resistance to compression to increase significantly when the dampening units cannot expand and further within the piston housing, which in turn affects the resistance profile of the piston assembly 540. As a UX feature, this may be perceived by a user as "play" that occurs in real vehicles, where a pedal (e.g., brake, accelerator, clutch) is initially easy to push for a short distance, followed by a significant increase in resistance as the user continues depressing the pedal.

In operation, the piston pin subassembly typically moves up and down along the z-axis within the piston housing as the pedal is pressed by a user and the bearing cap presses against the dampening units. The piston housing typically remains fixed in the z-direction, but can rotate on the cross pin interface on the x-axis. That is, piston housing 650 can remain coupled to cross pin 530b via cross pin interface 655 as the piston pin subassembly moves within the piston housing in a piston-like fashion. For example, in some embodiments, an angle between the biasing module (e.g., piston assembly 600) may vary between about 31.5° and 28.78°, for about 3.7° of rotation. Some embodiments may rotate less (e.g., approximately 2.5°) or more, as would be appreciated by one of ordinary skill in the art with the benefit of this disclosure.

The saddle-shaped contour of cross pin interface 655 can provide a secure connection to cross pin 530b (e.g., compression fit) without being fixedly connected like t-joint 610 is to pedal arm 620. The saddle shape has large enough flanges (forming the sides of the saddle shape) to prevent piston assembly 600 from sliding off of cross pin 530b (in the x or y direction), but is not fixed so that a user could quickly decouple piston assembly 600 from base platform 510, for example, to change out dampening units to alter the resistance profile of pedal module 500. In typical embodiments, a user can pull on piston housing 650 (+z direction) to compress the piston (e.g., enough to clear the flanges of cross-pin interface 655) and move the piston assembly in the y-direction so that piston assembly 600 is decoupled from base platform 510 and no longer aligned with cross pin 530b. Once piston assembly 600 is decoupled from cross-pin 530b, piston housing 650 can be removed from the piston subassembly (e.g., coupled via a complementary threaded relationship or other suitable coupling method) by unscrewing the piston subassembly, which gives access to the dampening units disposed therein, thus providing a "quick release" architecture that allows a user to quickly and easily swap out dampening units to change a resistance profile of the pedal module without any special tools. In some cases, multiple dampening units may be used including a soft one with easy compression to allow the user to more easily perform the quick release process. Typically, the soft dampening unit (e.g., typically having a high compression ratio of >50%, such as foam dampening unit 1430 of FIG. 14B) compresses enough to clear the cross pin during the quick release process (referred to as "pre-travel"), but usually not much further (e.g., within 5-10 mm) than the pre-travel distance as the other firmer dampening units typically begin to fully engage and provide the majority of the resistance profile, as would be appreciated by one of ordinary skill in the art with the benefit of this disclosure. This process is depicted and described in more detail below at least with respect to FIGS. 12-16.

Figure 7:
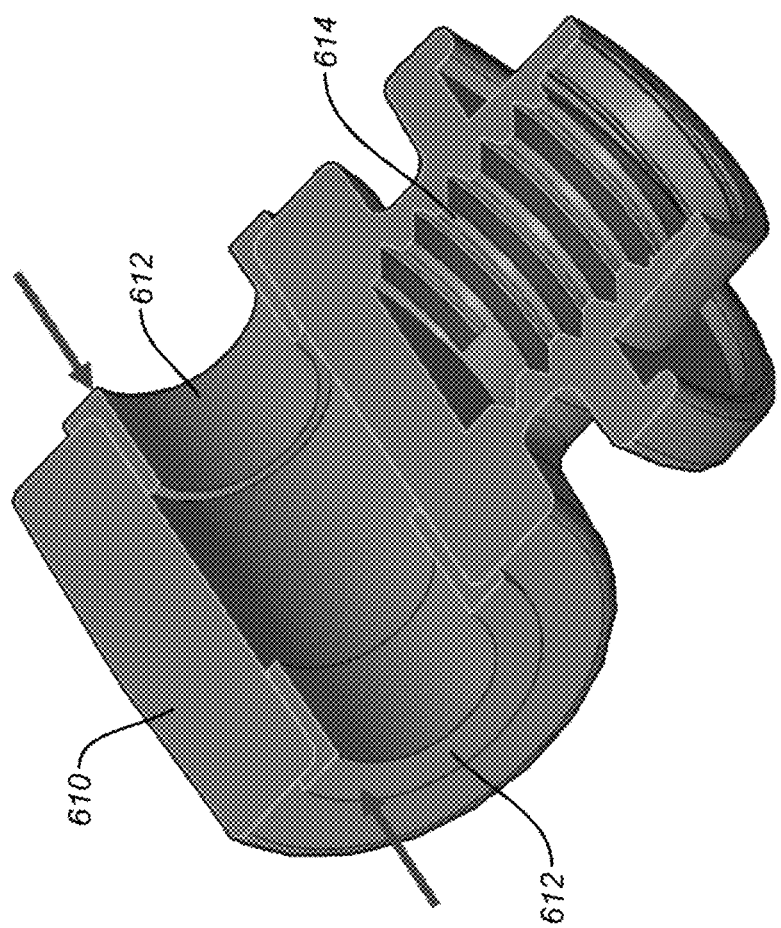
FIG. 7 shows a cross-section of certain aspects of a brake pedal piston assembly, according to certain embodiments.
Figure 8A:
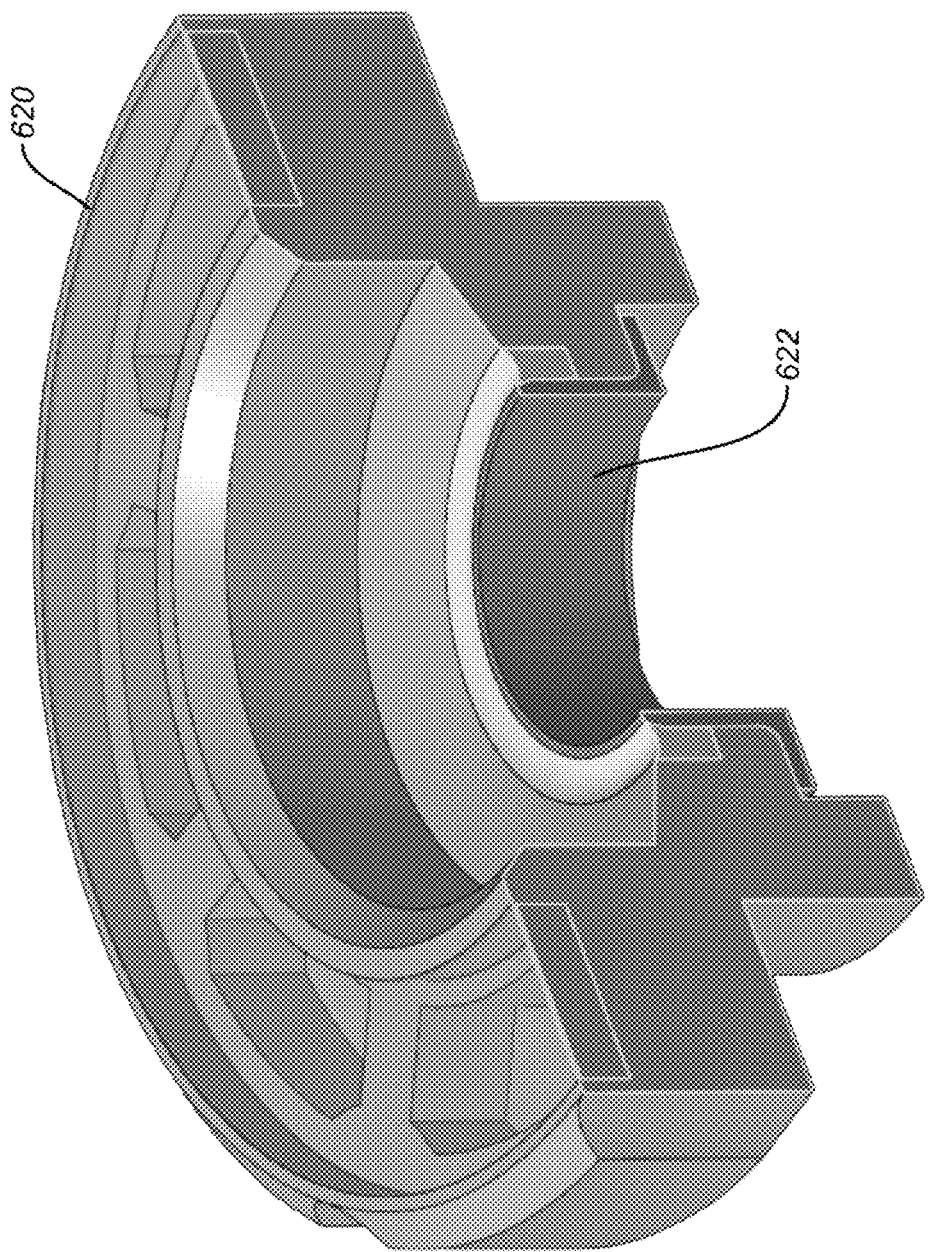
FIG. 8A shows a cross-section of a piston cap upper of a brake pedal piston assembly, according to certain embodiments.

FIG. 7 shows a cross-section of certain aspects of a brake pedal piston assembly, according to certain embodiments. In particular, t-joint 610 can include a hollow cylindrical portion that can be rotatably coupled to pedal arm 620 via a pin that can pass through both pedal arm 620 and t-joint 610 at anchor point 524, which provides an axis of rotation for the piston assembly relative to the pedal arm. Bearings 612 may be included in the hollow cylindrical portion to provide a smooth, low-friction rotation of t-joint 610, however some embodiments may not incorporate bearings or bushings. Alternatively, one or more bushings may be incorporated into the pedal arm rather than the t-joint. Threaded portion 614 may be configured to fixedly couple t-joint 610 to piston shaft 630, however other coupling mechanisms may be used (e.g., compression fit, slotted fit, pins, adhesive, etc.), as would be appreciated by one of ordinary skill in the art with the benefit of this disclosure.

Figure 8B:
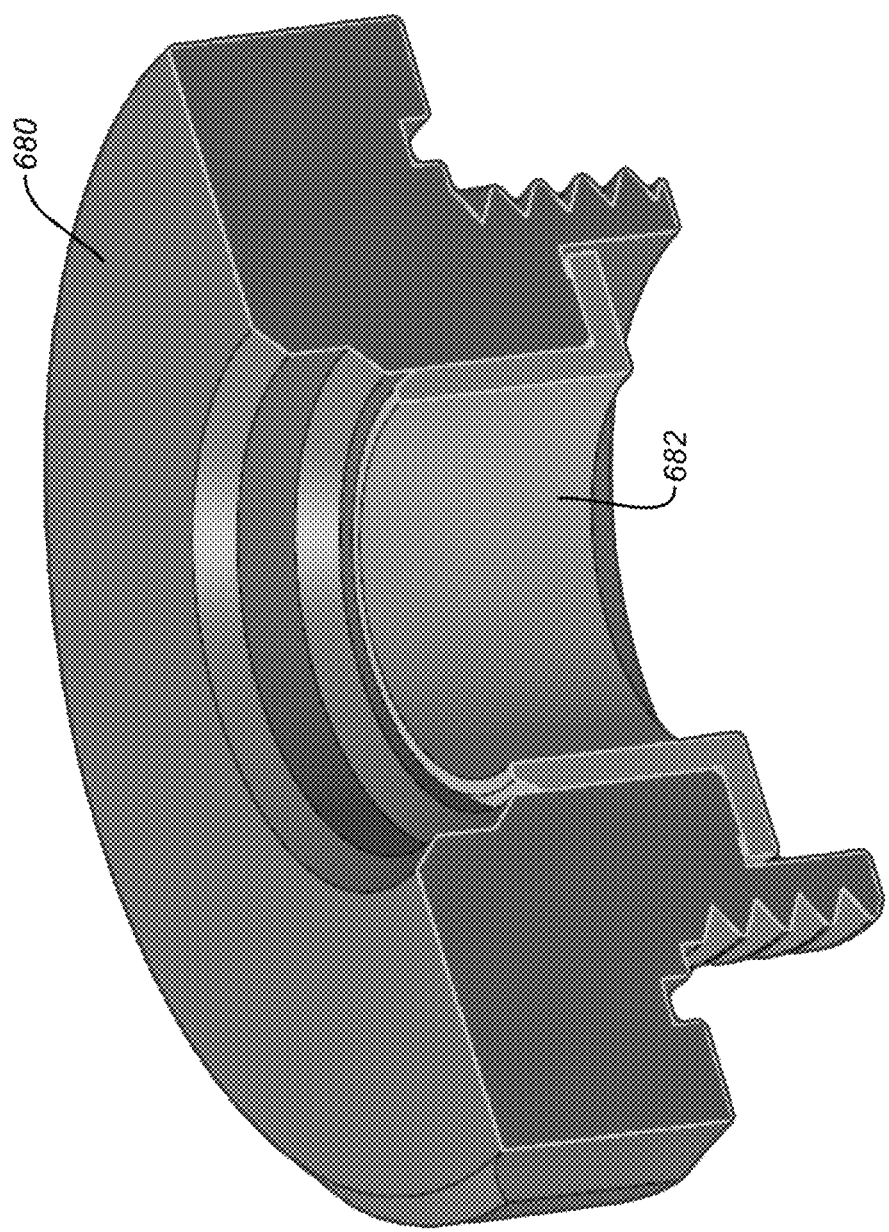
FIG. 8B shows a cross-section of an alternative embodiment of a piston cap upper of a brake pedal piston assembly, according to certain embodiments.
Figure 9A:
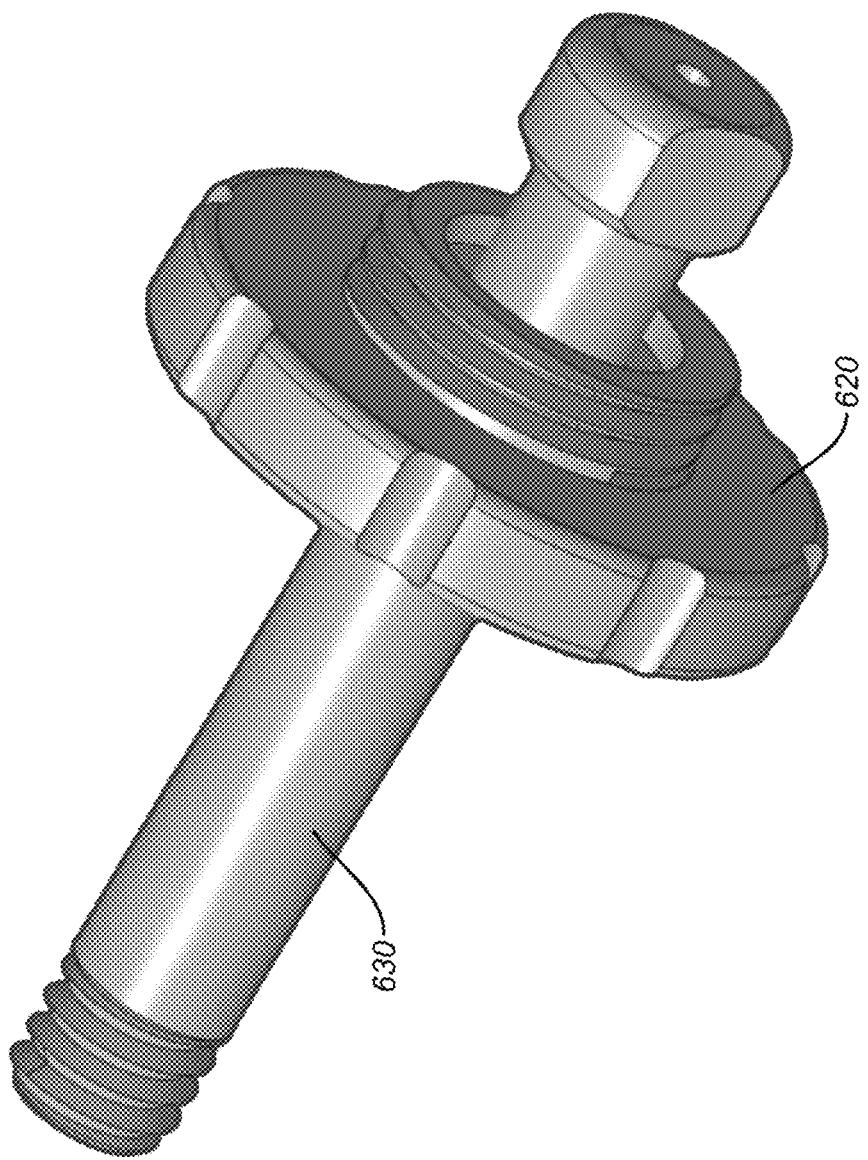
FIG. 9A shows how a piston shaft can be coupled to a piston cap upper, according to certain embodiments.
Figure 9B:
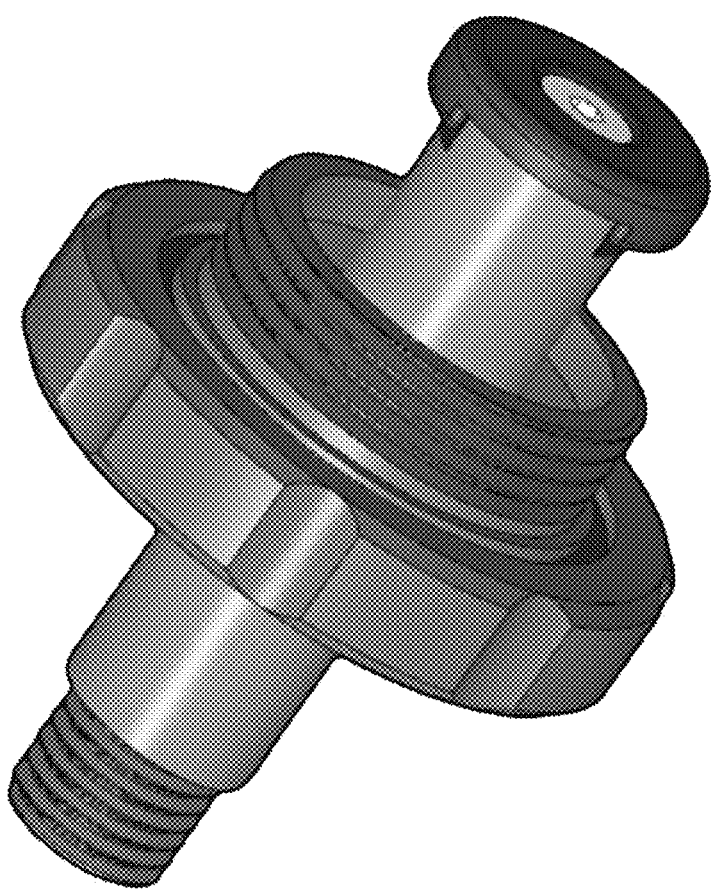
FIG. 9B shows an alternative embodiment of FIG. 9A.
Figure 10B:
FIG. 10B shows an alternative embodiment of FIG. 10A.

FIG. 8A shows a cross-section of piston cap upper 620 including bearings 622. In FIG. 9A, piston shaft 630 is coupled to piston cap upper 620, and t-joint 610 can be coupled to piston shaft 630 via a complementary thread locking arrangement including threads 614 of t-joint 610 and threads 635 of piston shaft 630, as shown in FIG. 10A. FIGS. 8B, 9B, and 10B show alternative embodiments thereof.

Figure 11:
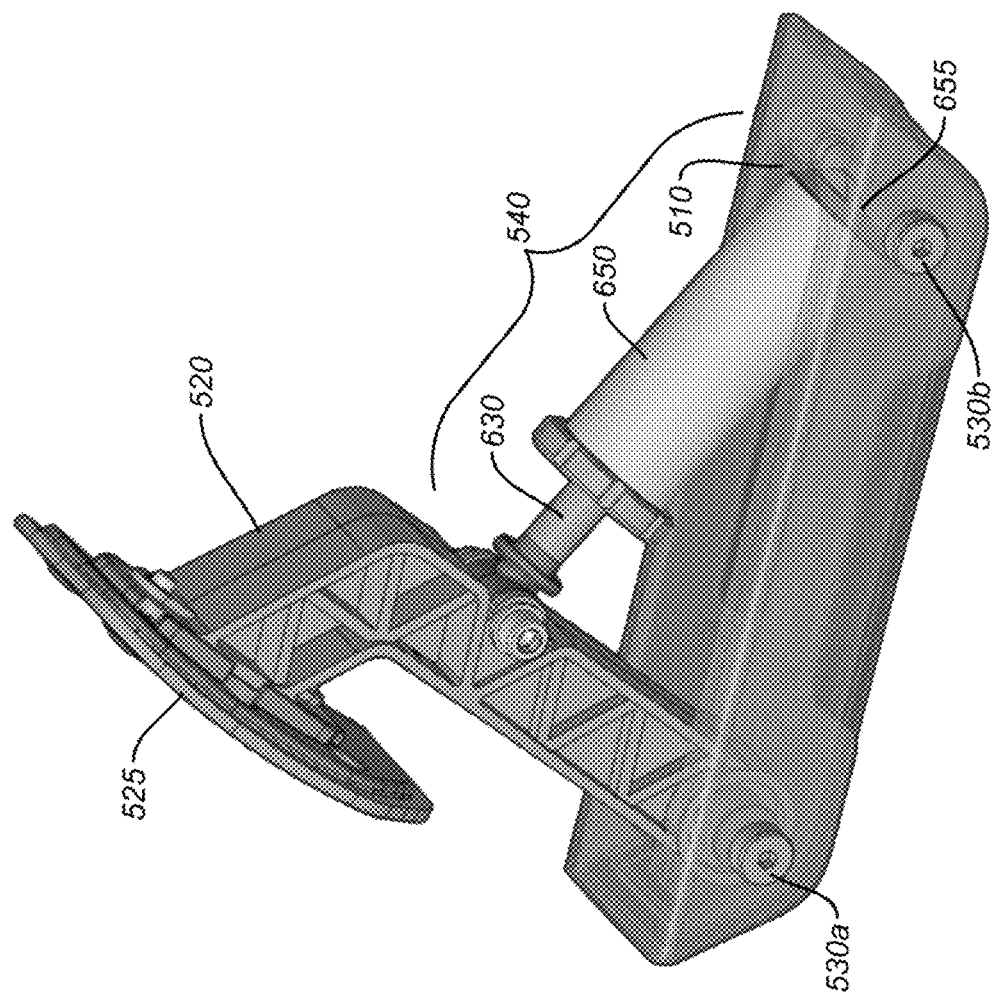
FIG. 11 shows aspects of a brake pedal assembly, according to certain embodiments.

FIG. 11 shows aspects of a brake pedal assembly 500, according to certain embodiments. FIG. 11 is similar to FIG. 5 but at a rear perspective view to better illustrate the relationship between the bottom end 655 of piston assembly 540 and cross pin 530*b*. FIG. 11 shows brake pedal assembly 500 in a slightly depressed configuration.

FIGS. 12-16 show aspects of a dampener replacement procedure, according to certain embodiments. As described above, aspects of the invention provide a novel quick-change assembly (e.g., piston assembly) that allows a user to rapidly change a resistance profile of the pedal (e.g., brake, accelerator, clutch) by hand with no special tools or equipment in less than a minute. More specifically, the user can quickly decouple the biasing module from the base platform to access, swap out dampening units, and recouple the biasing module to the base platform to achieve a desired resistance profile. Referring to FIG. 12, in order to decouple the biasing module (e.g., piston assembly 650) from base platform 510, a user can manually push on a front portion of the pedal arm with their thumb (e.g., see corresponding arrow for step 1) and simultaneously pull on the piston assembly 540 (e.g., at piston cap upper 620; see corresponding arrow for step 2) to impart a compression force on piston assembly 540 that is strong enough such that cross-pin interface 655 decouples from cross pin 530*b*. The user can then raise piston assembly 650 (e.g., see corresponding arrow for step 3; piston assembly 540 rotates at the axis of rotation at anchor point 524 to allow piston assembly to be lifted in the manner shown in FIG. 12) so that it is no longer in alignment with cross pin 530*b* and then release the compression force provided by the thumb (1) and fingers (2) so that pedal arm 520 and piston assembly 540 are at rest.

Once piston assembly 540 is at rest, it can be taken apart to access and expose the internal dampening units. Referring to FIG. 13, piston assembly 540 can be opened by rotating the piston housing 650 in the manner shown (e.g., counter clockwise) to unscrew the piston housing form the remainder of the piston assembly (e.g., the piston pin subassembly). As described above, a threaded coupling arrangement may be used, however other coupling implementations (preferably quick release implementations) can be used, as would be appreciated by one of ordinary skill in the art with the benefit of this disclosure. Although the threaded coupling can eliminate sliding between the piston pin subassembly and the piston housing, which can result in a more robust, low noise, low tolerance implementation.

Figure 14B:
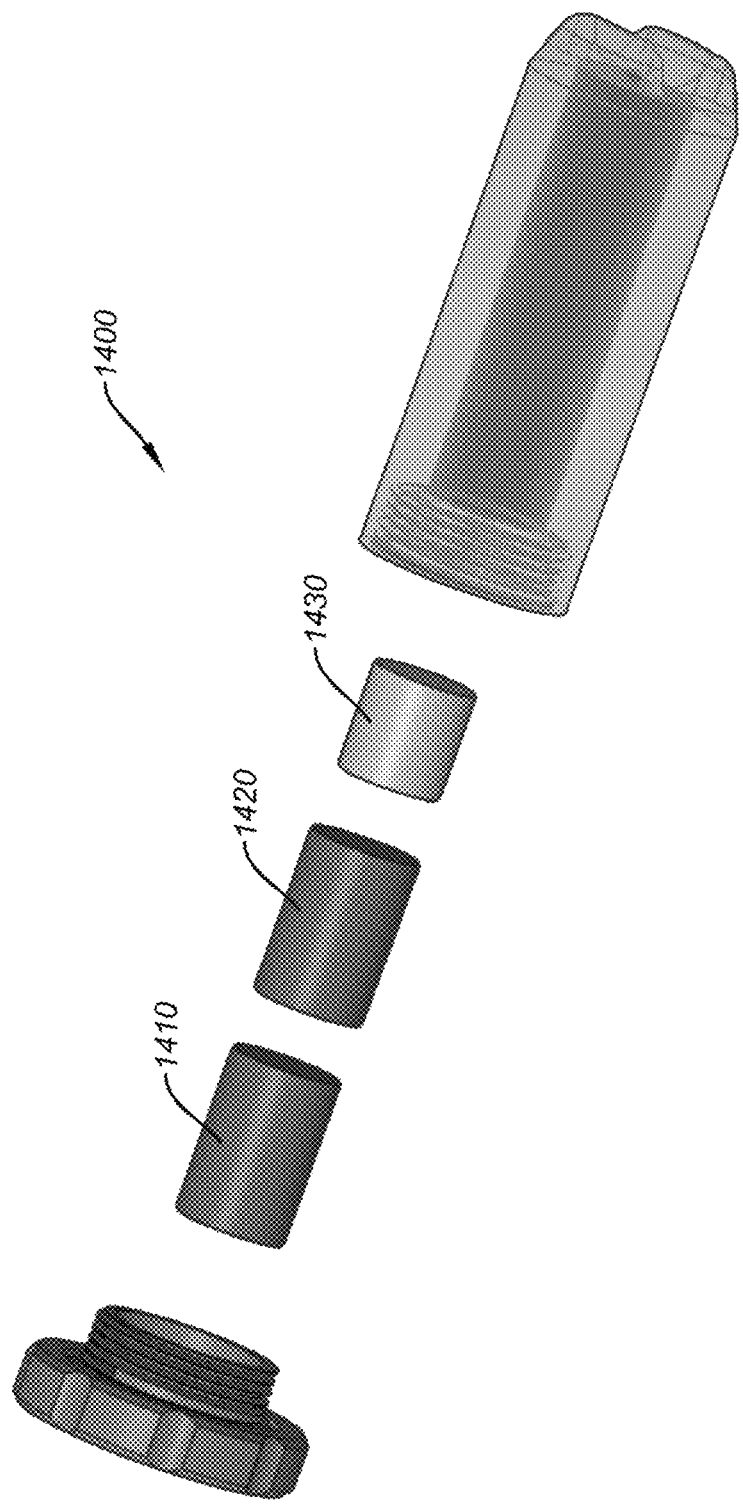
FIG. 14B shows an exploded view of a piston assembly, according to certain embodiments.

FIG. 14A shows aspects of a dampener replacement procedure, according to certain embodiments. Once piston housing 650 is removed, the old dampening unit(s) can be remove, and the new dampening unit(s) can be installed, as shown in the figure. The dampening units may be comprised of any suitable elastomer material (e.g., polyurethane; closed cellular polyurethane, such as BASF Cellasto®, VEITH Eladur Getzner Sylodyn®, Getzner Sylomer®; foams, silicone materials, sponge, etc.), or other suitable material. In some embodiments, a small foam dampener may be included in addition to the elastomer dampener(s). The foam can operate to provide some pre-travel to the piston assembly 540, which can make it easier for the user to pre-compress the piston assembly (see, e.g., FIG. 12) for coupling and decoupling the piston assembly from the base platform. The use of elastomers inside of a piston housing also provides a good user experience. As the dampeners deform when a force is applied, they contact the edges of the piston housing, which can provide further stiffness and affect the resistance profile provided by the dampening units. Dampening units may be made with different densities and/or compounds to achieve different resistance profiles, each having different deformation ranges. Combinations of dampening units can be used to achieve a desired resistance profile. In some exemplary embodiments, two elastomer-based dampening units and one foam dampening unit may be used in any suitable combination, as would be appreciated by one of ordinary skill in the art with the benefit of this disclosure. FIG. 14B shows an exploded view of a piston assembly 1400 using a three dampening unit configuration including two elastomer-based dampening units 1410, 1420 and one foam dampening unit 1430, according to certain embodiments.

By way of a non-limiting example, with a 35 kg of force on the pedal, a combination of various dampening units may provide different pedal travel, including 23 mm for extremely hard, 28 mm for hard, 32 mm for medium hard, 38 mm for medium soft, 42 mm for soft, and 48 mm for very soft, according to certain embodiments. Other combinations of dampening units could affect the travel in different ways. One of ordinary skill in the art with the benefit of this disclosure would appreciate the many modifications, variations, and alternative embodiments thereof.

FIG. 15 shows aspects of a dampener replacement procedure, according to certain embodiments. Once the replacement dampening units are installed, piston assembly 540 can be closed by rotating the piston housing 650 in the manner shown (e.g., clockwise) to screw the piston housing back to the piston pin subassembly. In some typical embodiments, when piston assembly 540 is fully closed (e.g., piston housing 650 is screwed on all the way), cross pin interface 655 should be oriented such that the flanges and u-shaped portion should align with cross pin 530*b*, as shown in the top right image of FIG. 15. If cross pin interface 655 is not aligned correctly, as shown in the bottom right image of FIG. 15, then piston assembly 540 will not mate with (couple to) cross pin 530*b* properly, thus care should be taken when reassembling piston assembly 540.

Figure 16:
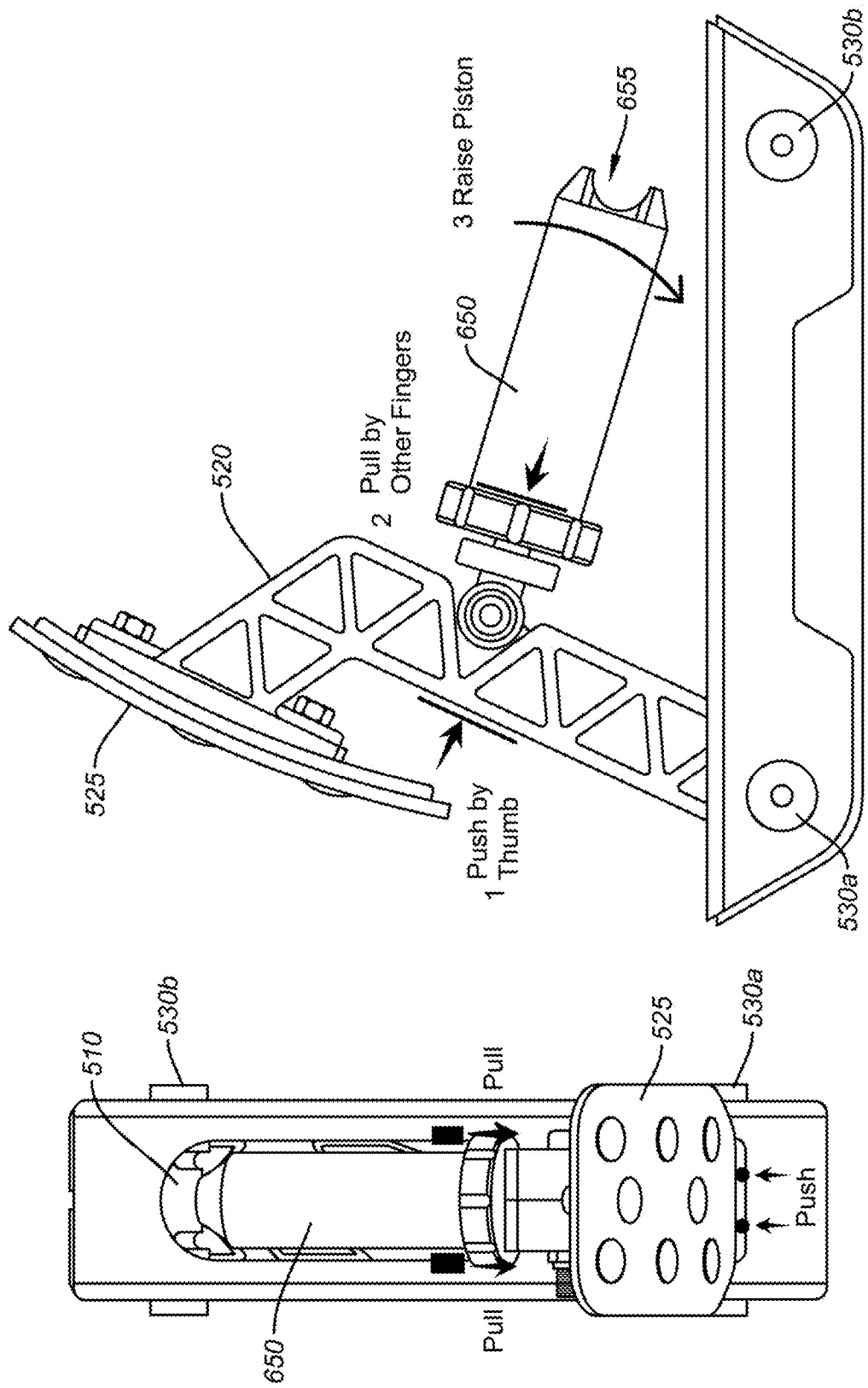
FIG. 16 shows aspects of a dampener replacement procedure, according to certain embodiments.

Referring now to FIG. 16, in order to couple the biasing module (e.g., piston assembly 650) back to base platform 510, a user can manually push on a front portion of the pedal arm with their thumb (e.g., see corresponding arrow for step 1) and simultaneously pull on the piston assembly 540 (e.g., at piston cap upper 620; see corresponding arrow for step 2) to impart a compression force on piston assembly 540 that is strong enough such that the flanges of cross-pin interface 655 can clear and couple to cross pin 530b. The user can then lower piston assembly 650 (e.g., see corresponding arrow for step 3; piston assembly 540 rotates at the axis of rotation at anchor point 524 to allow piston assembly to be lowered in the manner shown in FIG. 16) so that it is in alignment with cross pin 530b. The thumb and fingers can then release the compression force so that piston assembly 540 is compression fit back on to cross pin 530b.

Figure 17:
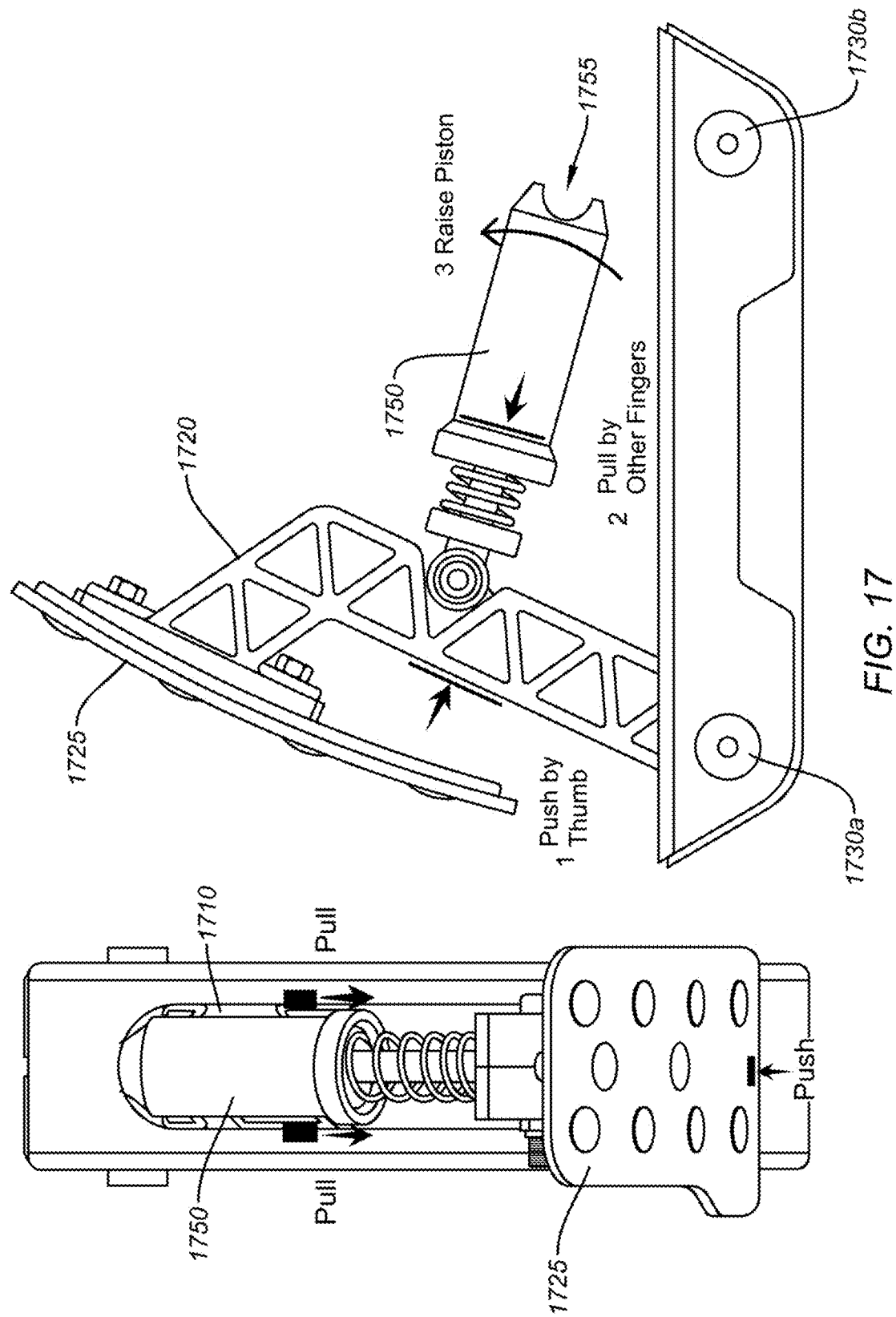
FIG. 17 shows aspects of an accelerator or clutch biasing mechanism replacement procedure, according to certain embodiments.

FIG. 17 shows aspects of an accelerator or clutch biasing mechanism replacement procedure, according to certain embodiments. The biasing mechanism replacement procedure for a clutch or accelerator can be similar to that of a brake assembly, as described above with respect to FIGS. 12-16, other than the inclusion of a spring assembly instead of elastomer-based dampening units, as described above. In some embodiments, different types of spring units (also referred to as dampening units) can be swapped out to achieve different resistance profiles. In other words, the quick change methodologies applies above with respect to a brake pedal module can be applied in a similar fashion, but with a different biasing mechanism scheme, as would be appreciated by one of ordinary skill in the art with the benefit of this disclosure.

FIG. 18 shows aspects of a cross pin 1800 for a gaming pedal system, according to certain embodiments. Cross pin 1800 may be similar to cross pin 530b as described above with respect to FIG. 5. In addition to providing a suitable surface to couple cross pin interface 655 of piston assembly 540 to base platform 510, cross pin 1800 is also contoured to include a strain gauge to measure a force imparted on the pedal module by a user. Conventional game pedal system designs often use strain gauges, but typically configure them in highly accessible locations, such as the front of the pedal arm. However, despite the relatively good accessibility, a wire (e.g., to couple the strain gauge sensor to a processor) typically needs to run through the pedal arm, which may introduce significant wear-and-tear, pinching, or damage to the wire over time, in addition to certain trade-offs with sensor accuracy and linearity due to the location of the strain gauge sensor, as would be appreciated by one of ordinary skill in the art with the benefit of this disclosure. In contrast, installing a strain gauge on the back of cross pin 1800 can be more difficult and expensive to install due to the limited space and obstructed location, however strain gauge measurements can be markedly more accurate as will be apparent in the following description.

Cross pin 1800 can include a rounded (cylindrical) portion 1805 and a flat portion 1820 on the opposite side. Base platform 510 can be coupled to cross pin 530b by a pin, axle, or other structure (not shown) that can feed through holes 1830. Two notches 1810a and 1810b are configured on the rounded portion of 1805 and equidistant from a center of the width of cross pin 1800, according to certain embodiments. Rounded cylindrical portion 1805 may be where cross pin interface 655 couples to cross pin 530b (1800) in a complementary fit arrangement, as further described above. Flat portion 1820 can be a mounting location for one or more strain gauges, which can be configured to measure a deflection of the cross pin caused by a force imparted on the cross pin by the biasing module and pedal arm. That is, as a force is applied to the pedal by a user, the force is transferred to the biasing module (e.g., piston assembly 540) and directly to the center of the back side (rounded cylindrical portion 1805) of cross pin 1800. This force causes cross pin 1800 to deflect, which can be measured by a strain gauge configured on flat portion 1820. Notches 1810a and 1810b can be added to cross pin 1800 to reduce its stiffness and increase the deflection of cross pin 1800, which can be more readily and accurately measured by the strain gauge sensors. Typically, the notches are configured symmetric to a center of cross pin 1800. In particular embodiments, the notches can be approximately 4 mm wide and 4.65 mm deep, however other dimensions are possible. Further, additional notches are possible. However, it should be noted that notches too close to the center may cause a central portion of the cross pin to weaken and deformation may be diffused over a long area. Cuts that are too far from center may also result with deformation being diffused over a long area. Preferably, the notches are configured for increased deformation (e.g., in some cases maximum deformation) of the cross pin for large signals on the corresponding strain gauge, however this is typically a tradeoff between good sensing sensitivity and a high resistance to mechanical fatigue on the cross pin, as would be appreciated by one of ordinary skill in the art with the benefit of this disclosure. Thus, unlike many contemporary designs configured for longevity (e.g., more robust parts), aspects of the invention incorporate notches to further induce deflection of the pin where a strain gauge is located, which may actually operate to reduce the longevity of the cross pin due to the weakened state caused by the notches.

Figure 19A:
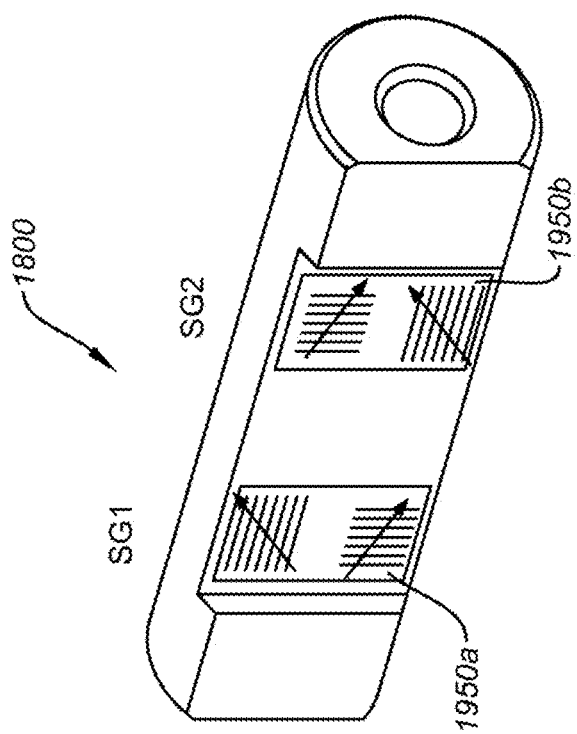
FIG. 19A shows a configuration for a strain gauge sensor on a cross pin, according to certain embodiments.
Figure 19B:
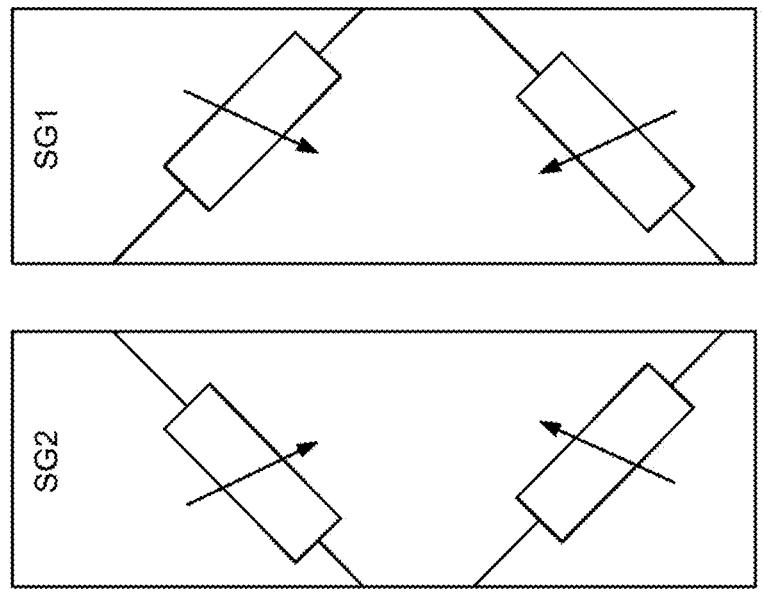
FIG. 19B shows aspects of a strain gauge sensor circuit diagram, according to certain embodiments.

FIG. 19A shows a configuration for a strain gauge sensor on a cross pin 1800, according to certain embodiments. Strain gauges 1950a and 1950b can be configured on flat portion 1820 of cross pin 1800. The strain gauges can be configured in a bridge topology, as shown in FIG. 19B. In some aspects, strain gauges 1950a and 1950b can be positioned equidistant from a center of flat portion 1820 at cross pin 1800. The strain gauge sensor may be configured to measure a deflection of the cross pin caused by a force imparted on the cylindrical portion 1805 of cross pin 1800 by the piston assembly (or other biasing module).

Figure 20:
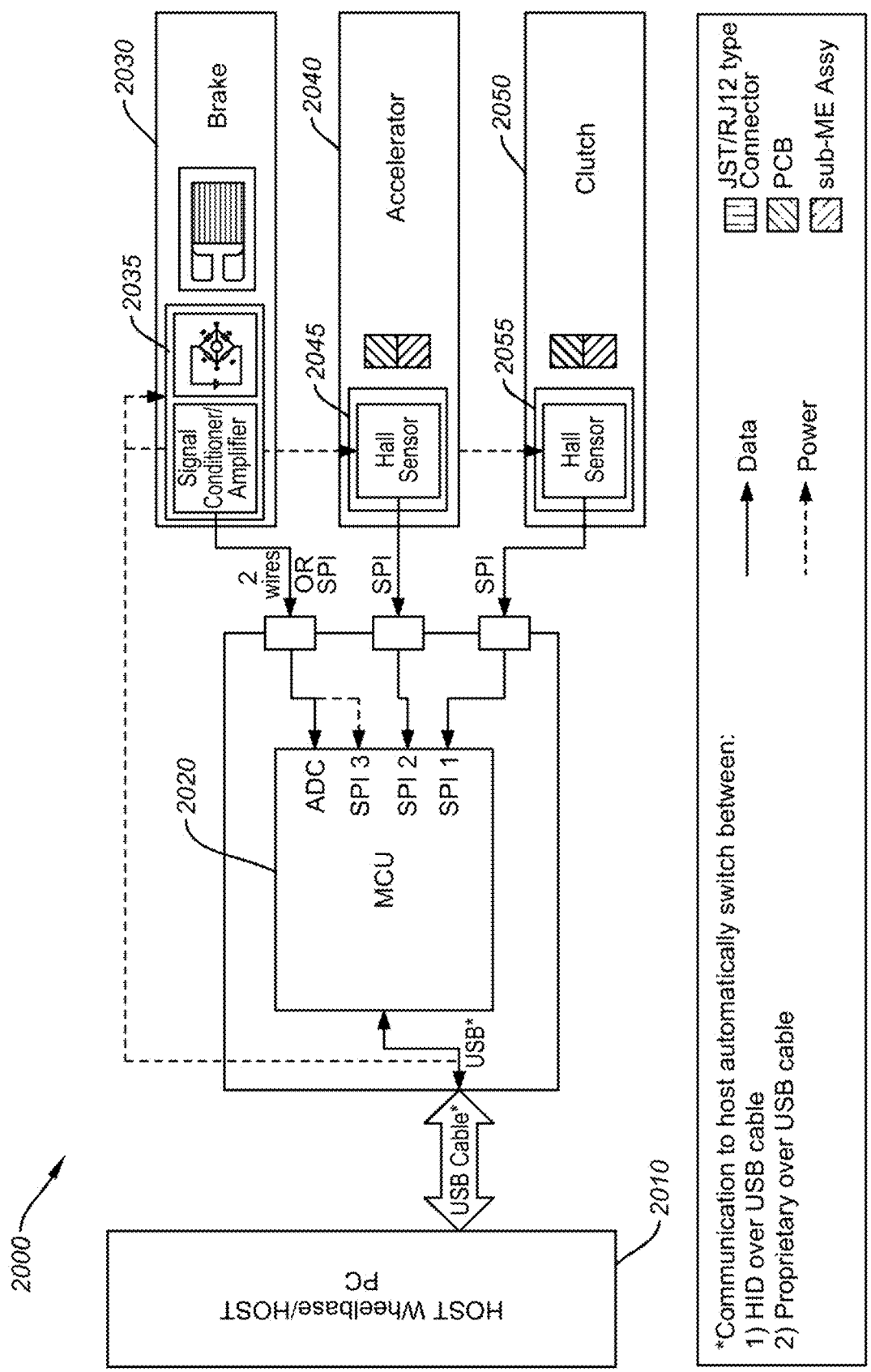
FIG. 20 shows a circuit diagram for processing strain gauge data on a gaming pedal assembly, according to certain embodiments.

FIG. 20 shows a circuit block diagram 2000 for processing strain gauge data on a gaming pedal system, according to certain embodiments. Circuit block diagram 2000 includes a host computing device 2010, one or more processors 2020, a brake pedal module 2030, accelerator pedal module 2040, and a clutch pedal module 2050. Brake pedal module 2030 can include a strain gauge sensor array 2035, and accelerator pedal module 2040 and clutch pedal module 2050 may each include hall sensors to detect pedal deflection, as would be appreciated by one of ordinary skill in the art with the benefit of this disclosure. Processor(s) 2020 may be coupled to host computer 2010 by USB or other wired or wireless communication protocol. The strain gauge sensor 2035 and hall sensors 2045, 2055 may be coupled to processor(s) 2020 by a wired or wireless communication protocol. Aspects of circuit block diagram 2000 may correspond to system 200. For example, processor(s) 2020 may be processor 210 of system 200. The input signals from strain gauge sensor 2035 and hall sensors 2045, 2055 may be part of input detection block 250. One of ordinary skill in the art with the benefit of this disclosure would appreciate the many modifications, variations, and alternative embodiments thereof.

In some embodiments, two values may be measured and recorded (e.g., during assembly) for calibration on a memory cell (e.g., EEPROM device) on the cross pin itself including a no load condition on the pedal face (e.g., 0 kg) and a 40 kg load (or other suitable load) on the pedal face center. Note that "no load" may include a pre-load due to springs and/or dampeners for an offset value. In some embodiments, and according to these two values, on-board firmware (FW) can compute the load cell or strain gauge sensitivity in order to give human interface device (HID) output from 0 to 180 kg over 12 bits. The offset value may be reevaluated (continuously or periodically) when the FW is operating. In some cases where the user changes the dampener/spring configuration, the offset value can be automatically re-computed, but may not be able to perform a new calibration at 40 kg, which can lead to a small offset of the reading. For a better estimate of the offset magnitude, it should be known which setting is going to be used during in-line calibration, and what is the preload to the cross pin with each setting. Thus, the calibration can characterize and optimize a specific load cell (e.g., strain gauge) for each pedal. Typically, changing of dampening units will not significantly impact how the strain gauge reacts to a load. However, preload may change and this can be automatically compensated by the FW implementation described above. In operation, force can be measured continuously (or periodically at a high rate, typically faster than once per 1 ms). When the force is measured to be very small (e.g., much lower than a typical user-provided force) and very stable (e.g., little change; more stable than a human could provide), it is likely that the difference likely comes from a configuration change. This can be performed at each boot up procedure.

Some embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A gaming pedal assembly comprising:
    a base platform;
    a pedal arm including:
        a first end rotatably coupled to the base platform at a first mounting location that provides a first axis of rotation for the pedal arm relative to the base platform; and
        a second end including a user interface region;
    a piston assembly having a resistance profile, the piston assembly including:
        a top end rotatably coupled to the pedal arm at a coupling location configured between the first end and second end of the pedal arm that provides a second axis of rotation for the piston assembly relative to the pedal arm; and
        a bottom end with a saddle-shaped interface rotatably coupled through a complementary, compression fit to the base platform via a cross pin at a second mounting location that provides a third axis of rotation for the piston assembly relative to the base platform,
        wherein the piston assembly compresses according to the resistance profile of the piston assembly in response to the user interface region of the second end of the pedal arm receiving a pressing force.

2. The gaming pedal assembly of claim 1 wherein the piston assembly further comprises:
    a cylinder housing;
    a shaft including a piston that moves linearly within the cylinder housing as the piston assembly is compressed and released; and
    one or more dampening units configured within the cylinder housing:
        wherein the piston presses against the one or more dampening units in response to the second end of the pedal arm receiving the pressing force,
        wherein the one or more dampening units provide the resistance profile.

3. The gaming pedal assembly of claim 2 wherein the piston assembly includes a removable portion coupled to the top end and the bottom end of the piston assembly, wherein the removable portion is configured to:
    be detachable from the gaming pedal assembly; and
    enable modification of the resistance profile when the removable portion is detached from the gaming pedal assembly.

4. The gaming pedal assembly of claim 3 wherein the removable portion is further configured to be removable from the gaming pedal assembly without tools.
    wherein a strain gauge is coupled to the cross pin at a second location opposite the first location, the strain gauge configured to detect an amount of deformation of the cross pin that corresponds to an amount of force applied to the user interface region.

5. The gaming pedal assembly of claim 3 wherein the removable portion includes a member that selectively configures the removable portion, when the removable portion is detached from the gaming pedal assembly, to either capture the one or more dampening units or enable the one or more dampening units to be removed from the removable portion.

6. The gaming pedal assembly of claim 3 wherein the removable portion includes the top end or the bottom end.

7. The gaming pedal assembly of claim 1 wherein the cross pin is coupled to the base platform at the second mounting location, the cross pin oriented normal to an orientation of the piston assembly.

8. The gaming pedal assembly of claim 1 wherein the piston assembly includes a quick-release architecture such that the piston assembly is configured to be decoupled from the cross pin and base platform when the piston assembly is manually compressed enough to overcome the compression fit that separates the saddle-shaped interface from a cylindrical portion of the cross pin.

9. The gaming pedal assembly of claim 8 wherein the bottom end of the piston assembly is rotatably coupled to the base platform at a first location of the cross pin,
wherein a strain gauge is coupled to the cross pin at a second location opposite the first location, the strain gauge configured to detect an amount of deformation of the cross pin that corresponds to an amount of force applied to the user interface region.

10. The gaming pedal assembly of claim 9 wherein the cross pin includes a number of detents configured to decrease a stiffness of the cross pin causing an increased deformation in response to the amount of force applied to the user interface region.

11. The gaming pedal assembly of claim 1 wherein a pedal platform is coupled to the user interface region, the pedal platform shaped as one of a brake pedal platform, accelerator pedal platform, or a clutch pedal platform.

12. A gaming pedal system comprising:
a base platform including a first cross pin and a second cross pin;
a pedal arm including:
a first end rotatably coupled to the base platform at the first cross pin that provides a first axis of rotation for the pedal arm relative to the base platform; and
a second end including a user interface region; and
a piston assembly having a resistance profile, the piston assembly including:
a top end rotatably coupled to the pedal arm at a coupling location configured between the first end and second end of the pedal arm that provides a second axis of rotation for the piston assembly relative to the pedal arm; and
a bottom end with a saddle-shaped interface rotatably coupled through a complementary, compression fit to the base platform via the second cross pin that provides a third axis of rotation for the piston assembly relative to the base platform.

13. The gaming pedal system of claim 12 wherein the piston assembly compresses according to the resistance profile of the piston assembly in response to the user interface region of the second end of the pedal arm receiving a pressing force.

14. The gaming pedal system of claim 12 wherein the piston assembly includes a quick-release architecture such that the piston assembly is configured to be decoupled from the second cross pin and base platform when the piston assembly is manually compressed enough to overcome the compression fit that separates the saddle-shaped interface from a cylindrical portion of the second cross pin.

15. The gaming pedal system of claim 12 wherein the piston assembly further comprises:
a cylinder housing;
a shaft including a piston that moves linearly within the cylinder housing as the piston assembly is compressed and released; and
one or more dampening units configured within the cylinder housing:
wherein the piston presses against the one or more dampening units in response to the second end of the pedal arm receiving a pressing force,
wherein the one or more dampening units provide the resistance profile.

16. A pedal system comprising:
a base platform including a first cross pin and a second cross pin;
a pedal arm rotatably coupled to the base platform at the first cross pin;
a piston assembly including:
a top end rotatably coupled to the pedal arm; and
a bottom end rotatably coupled to the second cross pin; and
a strain gauge coupled to the second cross pin and configured to detect an amount of deformation of the second cross pin that corresponds to an amount of force applied to the pedal arm.

17. The pedal system of claim 16 wherein the bottom end of the piston assembly forms a saddle-shaped interface, wherein the second cross pin includes a cylindrical portion, and wherein the saddle-shaped interface of the piston assembly couples to the cylindrical portion of the second cross pin in a complementary fit relationship.

18. The pedal system of claim 17 wherein the second cross pin further includes a flat surface opposite the cylindrical portion, and wherein the strain gauge is coupled to the strain gauge on the flat surface.

* * * * *